(12) United States Patent
Nakayama

(10) Patent No.: US 6,768,813 B1
(45) Date of Patent: *Jul. 27, 2004

(54) PHOTOGRAMMETRIC IMAGE PROCESSING APPARATUS AND METHOD

(75) Inventor: Toshihiro Nakayama, Saitama (JP)

(73) Assignee: PENTAX Corporation, Tokyo (JP)

( * ) Notice: Subject to any disclaimer, the term of this patent is extended or adjusted under 35 U.S.C. 154(b) by 476 days.

This patent is subject to a terminal disclaimer.

(21) Appl. No.: 09/594,035

(22) Filed: Jun. 15, 2000

(30) Foreign Application Priority Data

Jun. 16, 1999 (JP) ......................................... P11-169969

(51) Int. Cl.$^7$ .............................................. G06K 9/00
(52) U.S. Cl. ....................................... 382/154; 345/419
(58) Field of Search ................................ 382/154, 285; 345/419–427; 356/12–14; 348/578, 580

(56) References Cited

U.S. PATENT DOCUMENTS

| | | | |
|---|---|---|---|
| 5,699,444 A | | 12/1997 | Palm |
| 5,850,352 A | * | 12/1998 | Moezzi et al. ............... 345/419 |
| 5,995,765 A | * | 11/1999 | Kaneko et al. ............... 396/89 |
| 6,097,854 A | * | 8/2000 | Szeliski et al. ............. 382/284 |
| 6,108,497 A | * | 8/2000 | Nakayama et al. ......... 396/429 |
| 6,144,761 A | * | 11/2000 | Kaneko et al. ............. 382/154 |
| 6,246,412 B1 | * | 6/2001 | Shum et al. ................. 345/419 |
| 6,304,669 B1 | * | 10/2001 | Kaneko et al. ............. 382/154 |
| 6,469,710 B1 | * | 10/2002 | Shum et al. ................. 345/619 |
| 6,618,497 B1 | * | 9/2003 | Nakayama ................... 382/154 |
| 6,618,498 B1 | * | 9/2003 | Nakayama ................... 382/154 |
| 6,628,803 B1 | * | 9/2003 | Wakashiro et al. ......... 382/103 |

FOREIGN PATENT DOCUMENTS

| | | |
|---|---|---|
| JP | 10141951 | 5/1998 |
| JP | 10170263 | 6/1998 |
| JP | 10185562 | 7/1998 |
| JP | 10185563 | 7/1998 |
| JP | 10221072 | 8/1998 |
| JP | 10293026 | 11/1998 |
| JP | 10307025 | 11/1998 |

OTHER PUBLICATIONS

English Language Abstract of JP 10–307025.
English Language Abstract of JP 10–221072.
English Language Abstract of JP 10–185563.
English Language Abstract of JP 10–185562.
English Language Abstract of JP 10–170263.
English Language Abstract of JP 10–141951.

* cited by examiner

Primary Examiner—Bhavesh M. Mehta
Assistant Examiner—Aaron Carter
(74) Attorney, Agent, or Firm—Greenblum & Bernstein, P.L.C.

(57) ABSTRACT

A photogrammetric image processing apparatus and method defining a plurality of pairs of images including a common target as belonging to the same groups (pairs), providing an image display area and drawing area on the screen of the display device, displaying images of a pair 1 on the image display area, calculating a valid mapping range for the pair 1, displaying an area marker showing the valid mapping range on the survey map superimposed in the drawing area, designating corresponding image points on the image of the pair 1 to calculate the three-dimensional coordinates of physical points, and generating a survey map based on the three-dimensional coordinates.

17 Claims, 17 Drawing Sheets

PHOTOGRAMMETRIC IMAGE PROCESSING APPARATUS AND METHOD

BACKGROUND OF THE INVENTION

1. Field of the Invention

The present invention relates to image processing in photogrammetry.

2. Description of the Related Art

Photogrammetry is being widely used in making maps and is also being used as an extremely effective tool in recording local conditions at examinations of the scenes of traffic accidents for example. Conventionally, in photogrammetry, a stereo camera system consisting of two cameras, fixed at a distance away from each other, is used so as to calculate the three-dimensional coordinates of surveyed points from the two images captured by the two cameras. The stereo camera system is a large, heavy piece of equipment. Further, the calculation of the three-dimensional coordinates requires recording of detailed information such as the positional information and angle of inclination of the camera and the measured length of a target object etc. The surveying work is both complicated and hard in terms of labor. Further, a sufficiently clear photographic environment often can not be secured, such as when there are obstacles in the area surrounding the scene of a traffic accident. Often examination of the scene by stereo camera systems is difficult.

Therefore, the assignee has proposed a large number of photogrammetric methods using single lens cameras (Japanese Unexamined Patent Publication (Kokai) No. 10-293026 and Japanese Unexamined Patent Publication (Kokai) No. 10-221072) and targets to be included in pairs of images (hereinafter referred to as "paired images") for improving the precision of photogrammetry (Japanese Unexamined Patent Publication (Kokai) No. 10-307025, Japanese Unexamined Patent Publication (Kokai) No. 10-293026, Japanese Unexamined Patent Publication (Kokai) No. 10-185563, Japanese Unexamined Patent Publication (Kokai) No. 10-185562, Japanese Unexamined Patent Publication (Kokai) No. 10-170263, and Japanese Unexamined Patent Publication (Kokai) No. 10-141951) for realizing efficient photogrammetry with simple equipment.

Such a photogrammetric method obtains paired images taken of the same target and survey object from different directions and uses a mouse or other input means in a specialized photogrammetric image processing apparatus to manually designate surveyed points commonly included in the paired images (hereinafter referred to as "physical points") and thereby survey any range based on these points.

Since a large number of paired images are used when the survey extends over a broad range, the manual finding and designating of the corresponding physical points in each of the paired images becomes complex, of course. Further, considering the need for survey precision, selection of the physical points to obtain sufficient precision is extremely complicated even for a skilled operator.

The survey maps obtained from the large number of paired images are connected together. At the time of making the map, it is difficult to identify which positions of the surveyed range the obtained survey maps show and therefore it is necessary to designate a large number of physical points. Therefore, the work efficiency drops significantly.

SUMMARY OF THE INVENTION

An object of the present invention is to provide a photogrammetric image processing apparatus and method enabling a large improvement in efficiency of the manual work in photogrammetric image processing.

According to a first aspect of the present invention, there is provided a photogrammetric image processing apparatus defining a plurality of images commonly including a target at a predetermined position as being in the same group, calculating the position of the photographing camera taking each image and the inclination of its optical axis for each image, designating a common physical point in an image for each image, calculating three-dimensional coordinates of the physical point, and generating a survey map based on the three-dimensional coordinates, comprising an area computing means for calculating a valid mapping range enabling designation of a physical point effective for making a survey map based on the camera positions and inclinations of optical axes of all images for the group and generating an area marker based on the valid mapping range and a display means able to display the area marker on a screen of a display device superimposed on the survey map.

According to a second aspect of the present invention, there is provided a photogrammetric image processing method defining a plurality of images commonly including a target of a predetermined shape provided at a predetermined position and enabling output of an amount of displacement and rotational angle from an initial state as belonging to the same group, calculating the position of the camera taking the image and the inclination of its optical axis for each image, designating a common physical point in an image for each image, calculating the three-dimensional coordinates of the physical point, and generating a survey map based on the three-dimensional coordinates, the photogrammetric image processing method comprising a first step of calculating a valid mapping range corresponding to one group from the camera positions and inclinations of the optical axes of the images included in the group, a second step of generating an area marker based on the valid mapping range, a third step of displaying the area marker together with the image on the predetermined screen superimposed on the survey map, and a fourth step of designating a physical point in the area marker in each of the images displayed on the screen.

According to a third aspect of the present invention, there is provided a storage medium storing a photogrammetric image processing program defining a plurality of images commonly including a target arranged at a predetermined position as belonging to the same group, calculating the position of the camera taking each image and the inclination of its optical axis, designating a common physical point in an image for each image, calculating the three-dimensional coordinates of the physical point, and generating a survey map based on the three-dimensional coordinates, the photogrammetric image processing program including a routine for calculating an area marker for calculating a valid mapping range able to designate a physical point effective for making a survey map based on the camera positions and inclinations of the optical axes for the group and generating an area marker based on the valid mapping range and a processing routine for display of a drawing area able to display the area marker on a predetermined screen superimposed on the survey map.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Figure 1:
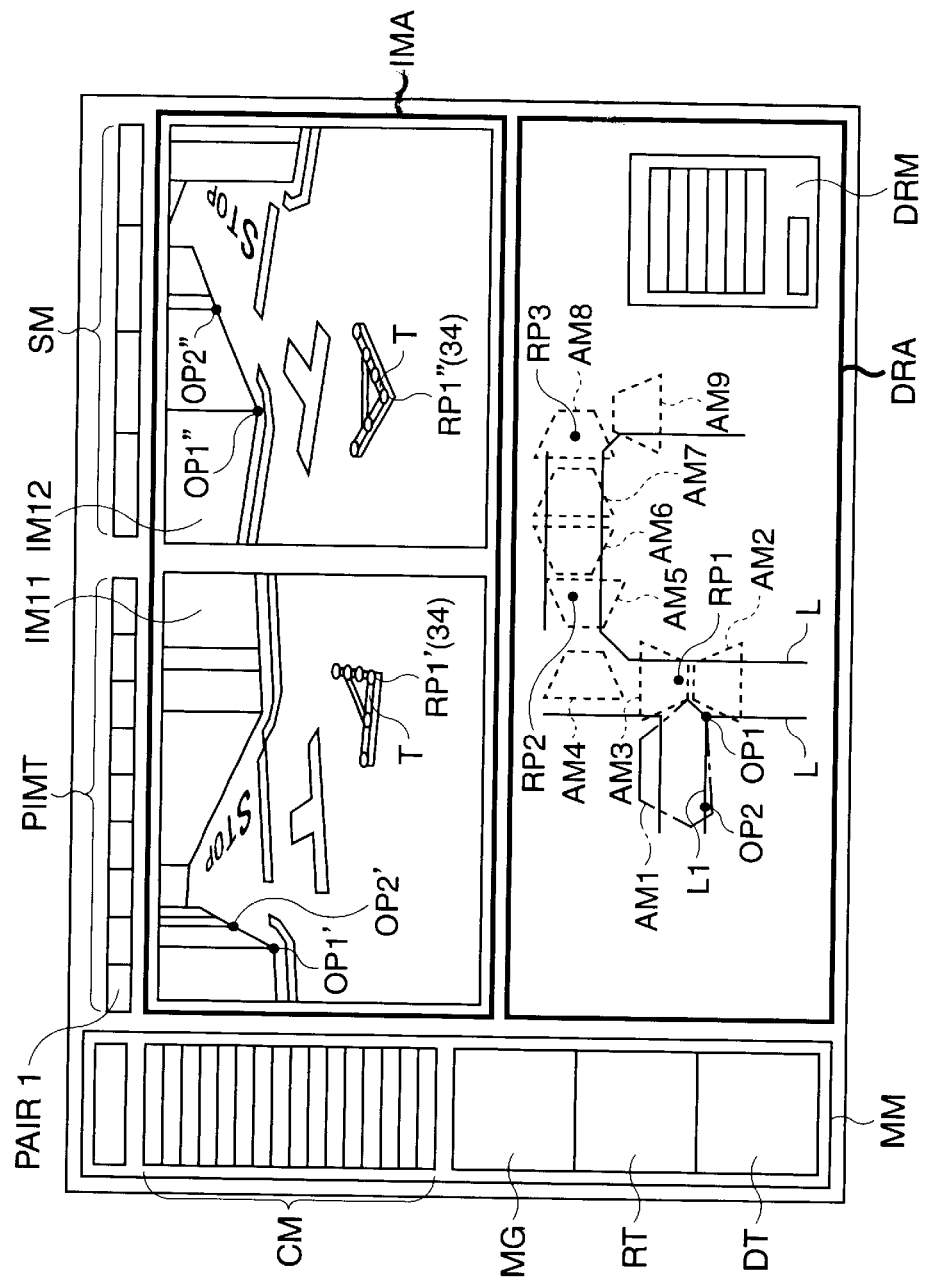
FIG. 1 is a schematic view of a display screen of a display device in a photogrammetric image processing apparatus according to a first embodiment of the present invention.

The present invention will be described below with reference to the embodiments shown in the drawings.

FIG. 1 shows a first embodiment of the present invention. This drawing shows a display screen of a display device 10 (FIG. 2) provided in a photogrammetric image processing apparatus. The image display area IMA of the display screen displays in parallel a pair of images IM11 and IM12 including a target T placed on the ground surface. The target T is common in the images IM11 and IM12. The images IM11 and IM12 form a single group (pair 1). Note that while not shown in FIG. 1, paired images of pairs 2 to 9 are defined in addition to the pair 1.

The 18 images of the pairs 1 to 9 including the images IM11 and IM12 are obtained by a digital camera. Specifically, optical images of the object are formed on a CCD or other imaging device (not shown) and stored as digital pixel data in a memory card or other image storage medium.

The work of selecting two images from the large number of images stored in the image storage medium and defining them as belonging to a group is manually performed in advance by the operator. Note that in the first embodiment, two images are made a group, but a group may also include three or more images as well. Further, the number of pairs is not limited to nine.

Above the image display area IMA are provided a plurality of paired image selection tags PIMT. By clicking on one of these paired image selection tags PIMT, it is possible to select the paired images to be displayed on the image display area IMA from any of the pairs 1 to 9. Exactly the number of paired image selection tags PIMT (=9) corresponding to the number of pairs are shown. Further, above the image display area IMA is provided a supplementary menu SM. The supplementary menu SM may be used to select a command such as "CHANGE NAME OF PAIR", "RESET REFERENCE POINT", "CHANGE USER SETTING", "SET WINDOW", etc.

Below the image display area IMA is provided a drawing area DRA in which a survey map based on the 18 images of the pairs 1 to 9 (solid line L showing a contour of a road in the drawing etc.) is drawn. The survey map is a horizontal plan view of the road seen from above. Further, area markers AM1 (in the drawing, shown by the one-dot chain line) and AM2 to AM9 (in the drawing, shown by the broken lines) corresponding to the pairs 1 to 9 are displayed superimposed over the survey map.

Further, the drawing area DRA shows by a dot the target position RP1. The target position RP1 is defined by a reference point (34) provided on the target T. In the images IM11 and IM12, the reference point (34) is displayed as the image points RP1' and RP1". When these images are set to belong to one group, the correspondence between the two is defined by image processing. As a result, the three-dimensional coordinates of the reference point (34) are specified and displayed as the target position RP1 in the drawing area DRA.

The target T is suitably repositioned in accordance with the range to be photographed. The target positions RP2 and RP3 are shown set in the drawing area DRA. The target positions RP2 and RP3 are shown by relative coordinates having the target position RP1 as initial values. The relative coordinates are measured by a sensor (not shown) built into the target T, transmitted from the target T to the camera, and recorded together with the image data (digital pixel data). Due to this, when the pairs 1 to 9 are linked, the different target positions RP1, RP2, and RP3 are displayed in the same drawing area DRA.

A plurality of pairs (or at least one pair) of images are taken of the target T in the same position. The pairs 1 to 3 are images obtained when the target T is placed at the target position RP1. Similarly, the images of the pairs 4 to 6 capture the target T placed at the target position RP2, while the images of the pairs 7 to 9 capture the target T placed at the target position RP3.

When making the survey map, the corresponding image points in the paired images are designated manually. More specifically, when the image points OP1' and OP1" of a corner of the road in the images IM11 and IM12 are designated manually by a mouse, the three-dimensional coordinates of the physical point OP1 corresponding to these image points OP1' and OP1" are calculated and the physical point OP1 is displayed by a dot in the drawing area DRA.

In the drawing area DRA, the area markers AM1 to AM9 are areas enabling designation of physical points at a high precision at the time of making the survey map. In particular, the hexagonal area marker AM1 shown by the one-dot chain line is a detailed area marker showing a high precision range of guaranteed precision (hereinafter referred to as a "valid mapping range") obtained by superimposing ranges of guaranteed precision corresponding to the two images. The physical points OP1 and OP2 for making the survey map can be designated in the area marker AM1.

Note that the detailed area marker designates a physical point with a high precision. However, while effective for obtaining a good survey precision, since its form is a hexagonal shape, the detailed area marker has the defect that the operator finds it difficult to identify the direction of the optical axis of the camera. Therefore, when area markers AM2 to AM9 are not being used for mapping, these areas are illustrated as trapezoids. The line perpendicular to the two parallel sides of a trapezoid and passing through the center of the trapezoid corresponds to the optical axis. This trapezoid is called a "simple area marker" and is shown by broken lines in the drawing area DRA.

That is, when setting the pair 1 for mapping for designation of physical points as shown in FIG. 1, only the area marker AM1 corresponding to the pair 1 is set as the detailed area marker. The area markers AM2 to AM9 corresponding to the other pairs 2 to 9 are set as simple area markers. Due to this, the relative direction of the optical axis in the drawing area DRA can be easily discerned. Further, by displaying the area markers not for mapping in a simple manner, a readily recognizable screen can be obtained and the work efficiency improved.

For example, if the "pair 4" of the paired image selection tags PIMT is designated by a mouse, the displayed images of the image display area are switched to the images of the pair 4, the area marker AM1 is set as a simple area marker, the area marker AM4 is set as a detailed area marker, and the results are redisplayed in the drawing area DRA.

In this way, by displaying the image display area IMA and drawing area DRA on the same screen, displaying the paired images for mapping on the image display area IMA, and displaying the area markers in the drawing area DRA, the correspondence between designation of image points in the paired images and the correspondingly displayed physical points can be easily recognized.

Further, the drawing area DRA displays all of the area markers AM1 to AM9 and displays only the area markers for mapping by a different mode, so the relative positions of the pairs selected for mapping in all pairs can be easily viewed. Due to this, designation of physical points becomes easy throughout the plurality of pairs linked with area markers, the number of physical points designated can be reduced, and the work efficiency can be improved.

The drawing area DRA is provided with a menu DRM for mapping. The menu DRM allows the selection of commands such as "DRAW STRAIGHT LINE", "DRAW POLYGON", "DESIGNATE DIAMETER AND DRAW CIRCLE", "DESIGNATE RADIUS AND DRAW CIRCLE", "DRAW AUXILIARY POINT", and "END INPUT". For example, when "DRAW STRAIGHT LINE" is selected, if the physical points OP1 and OP2 are continuously designated, the line L1 connecting the two points OP1 and OP2 is automatically produced and displayed in the drawing area DRA.

At the left side of the image area IMA and drawing area DRA is provided a main menu MM. Inside the main menu MM are provided a command menu CM, magnification setter MG, rotation setter RT, and display setter DT. The command menu CM allows the selection of commands such as "DRAW ROAD CONTOUR", "ENTER CONTRACTOR ID", "ENTER GRAPHIC ID", "ENTER ID", "ENTER TEXT", "SURVEY", "EDIT IDS AND GRAPHICS", "RESTORE ORIGINAL", "ERASE", "STORE DRAWING", "SET PRINTING", "PRINT DRAWING", and "CORRECT DRAWING". The magnification setter MG can suitably set the magnification rate in the drawing area DRA, while the rotation setter RT can suitably set the rotation of the survey map etc. displayed in the drawing area DRA. Further, the display setter DT switches between displaying and not displaying the area markers and sets changes in the line type, line width, color, etc. of the area markers.

Figure 2:
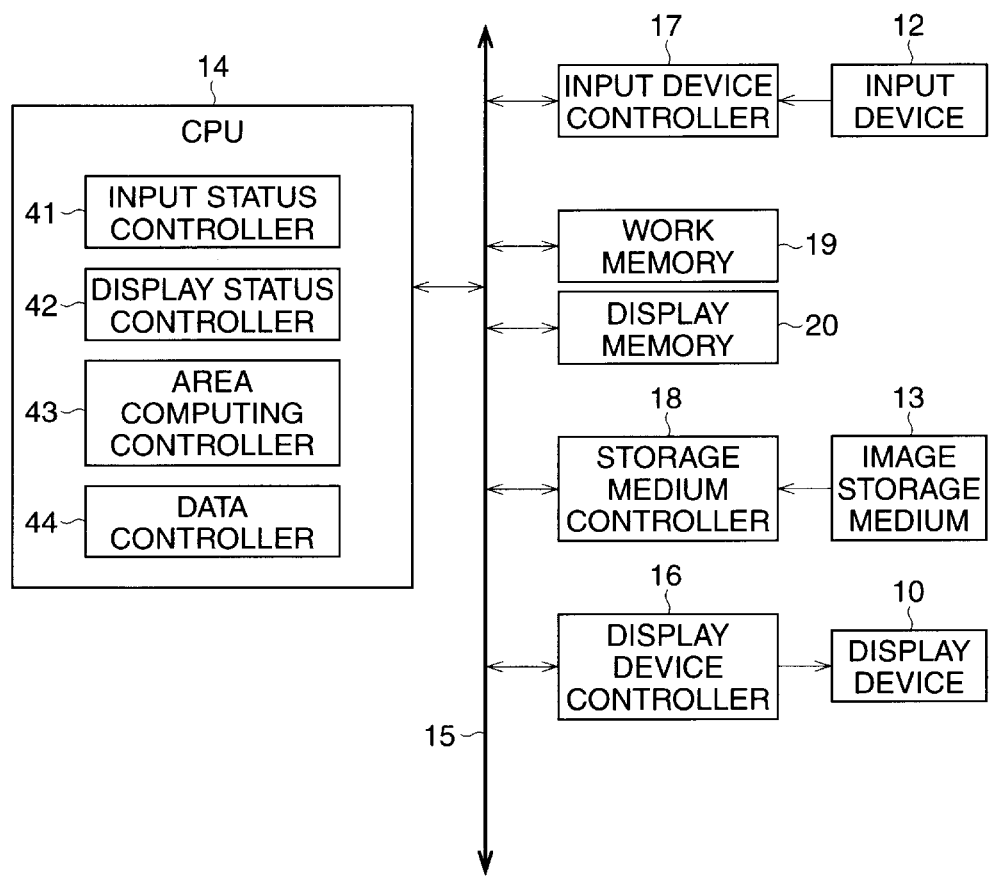
FIG. 2 is a block diagram of the overall configuration of a photogrammetric image processing apparatus.

FIG. 2 is a block diagram of the overall configuration of the photogrammetric image processing apparatus. It has, in addition to the display device 10 showing the content of the display in FIG. 1, an input device 12 such as a keyboard, a mouse or the like, an image storage medium 13 such as a memory card or the like, and a CPU 14. These are connected directly or indirectly to a bus 15.

The CPU 14 is provided with an input status controller 41, a display status controller 42, an area computing controller 43, and a data controller 44 and executes the necessary control, computation, and processing. The input device 12 is connected to an input device controller 17 connected to the bus 15, whereby inputs from the input device 12 are transferred to the bus 15 or the input mode etc. of the input device 12 is set. The image storage medium 13 is inserted in a memory card reader or other storage medium controller 18, whereby the photo data (FIG. 3) stored in the image storage medium 13 is suitably read out.

Further, the bus 15 is connected to a work memory 19 and display memory 20. The work memory 19 is used as a cache memory etc. for computation and processing by the CPU 14, while the display memory 20 holds the content (FIG. 1) to be displayed on the display device 10. The display device 10 is connected to a display device controller 16 connected to the bus 15, while the display device controller 16 converts the digital data in the display memory 20 to an analog RGB signal for the display device 10.

The input status controller 41 of the CPU 14 controls the settings of the input device 12 or converts the input information, for example, mouse coordinates or alphanumerics input from the keyboard, into predetermined digital data. The display status controller 42 controls the content to be displayed on the display device 10 and changes the content of the display when there is a change in the settings of the display etc. The area computing controller 43 is used for the later explained image processing, calculation of coordinates, etc. A data controller 44 controls the content of the data read from the image storage medium 13 or controls the content of settings of the paired images set on the screen of FIG. 1, the various coordinate data prepared based on this, the data of the survey map made, etc.

Figure 3:
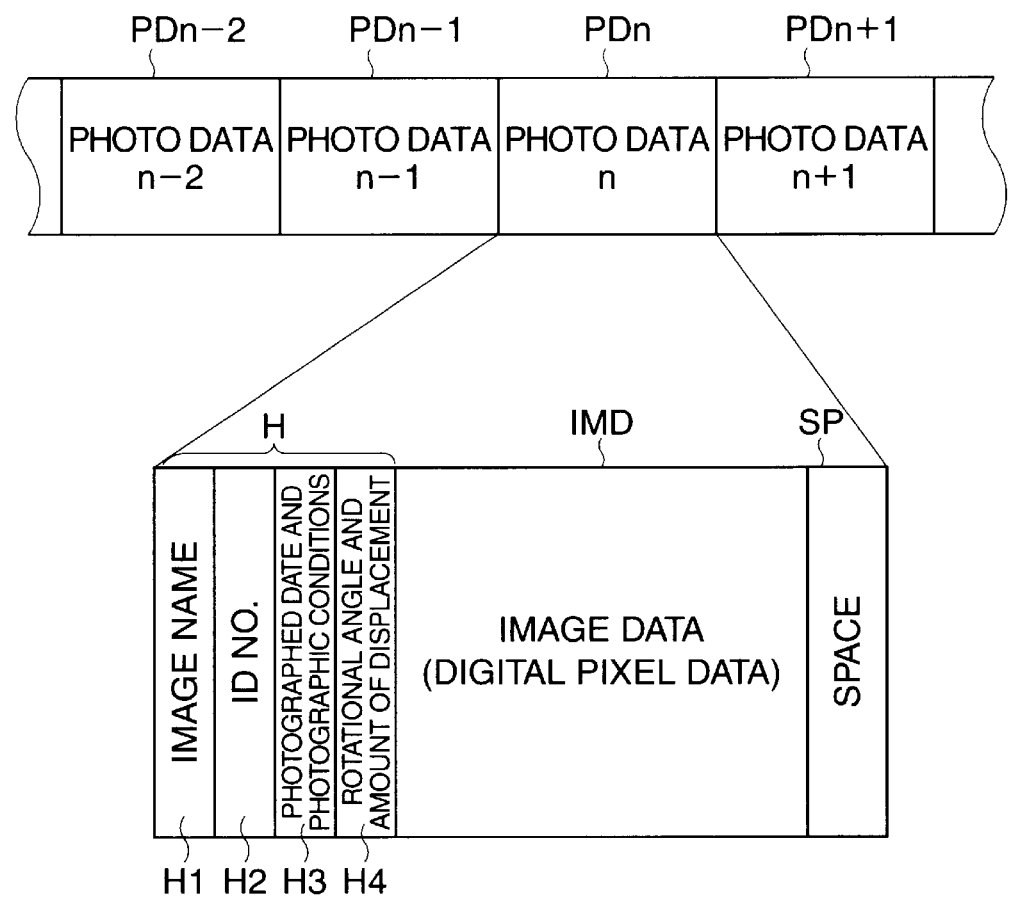
FIG. 3 is a schematic view of the format of photo data stored in an image storage medium of FIG. 2.

FIG. 3 is a view of the format of surveyed photo data stored in the image storage medium 13. A plurality of sets of photo data (in FIG. 3, the (n−2)th to (n+1)th photo data are shown) are successively stored. One set of photo data (n−th) is comprised of a header H and image data IMD and is provided with a spare space SP after the image data IMD for separation from the adjoining photo data. The image data IMD is a string of digital pixel data.

The header H includes an image name H1, ID no. H2, photographed date and photographic conditions H3, rotational angle and amount of displacement H4, etc. The image name Hi and photographed date in the photographed date and photographic conditions H3 are input manually into the camera. The ID no. H2 includes for example a photographic position no. incremented by "1" with every shot taken and a target position no. incremented by "1" at the time of relocation of the target T, and is used for selection of paired images which were manually paired by the operator, calculation of area markers, etc. The photographic conditions in the photographed date and photographic conditions H3 are input from the camera at the time of photographing and include the focal distance f of the camera, the horizontal and vertical direction angle of views Θh and Θv, the CCD resolution power rp, etc. In the rotational angle and amount of displacement H4, the rotational angle includes the rotational angle and azimuth of the target with respect to the horizontal plane at the time of photography, while the amount of displacement is the amount of displacement from the initial target position RP1 (FIG. 1). Signals of the rotational angle and amount of displacement are transmitted from the target T included in the image to the camera.

Figure 4:
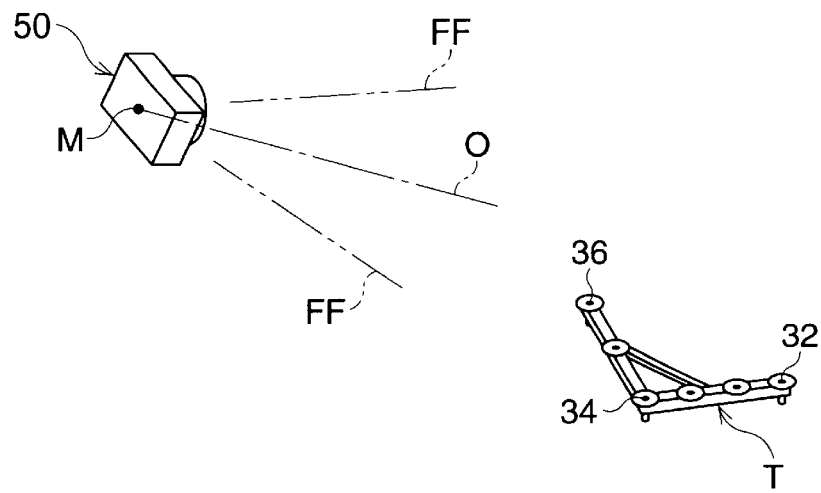
FIG. 4 is a perspective view of the state of photographing an image to be processed by the photogrammetric image processing apparatus of FIG. 2.
Figure 5:
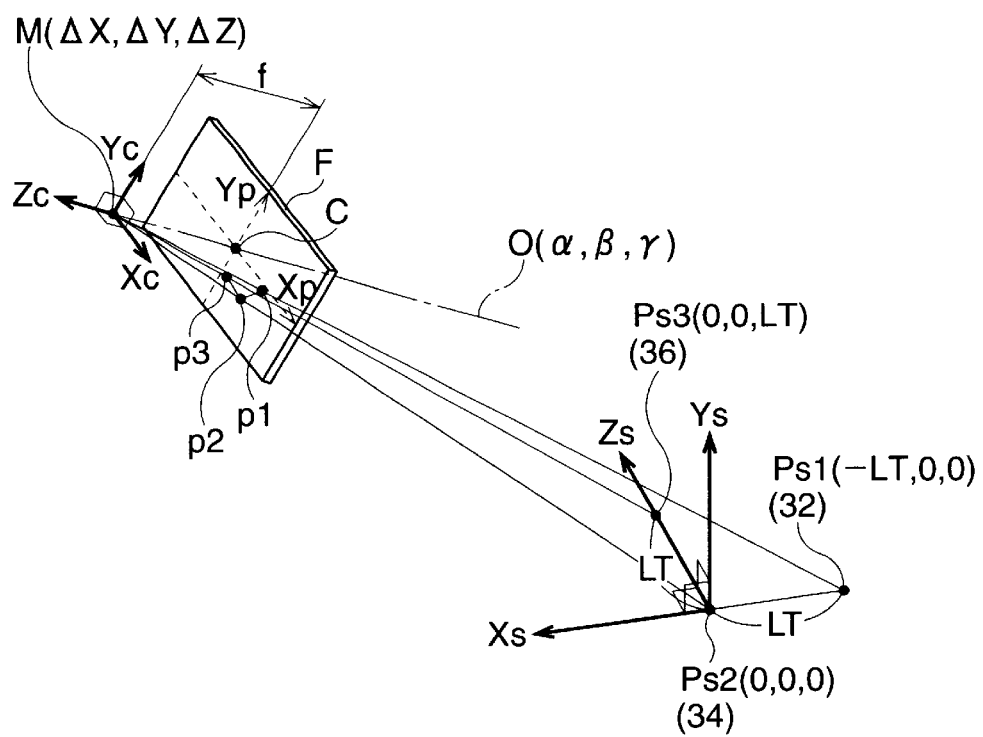
FIG. 5 is a perspective view schematically showing the relationship among an image, camera position, and target under the photographing conditions of FIG. 4.
Figure 6:
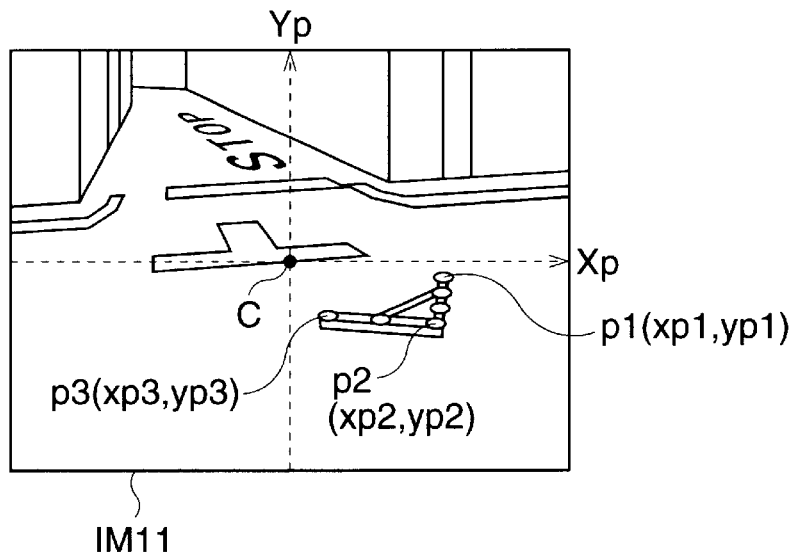
FIG. 6 is a schematic view of an image obtained under the photographing conditions of FIG. 4.

An explanation will be given next of the calculation of the camera position and inclination of the optical axis using the target T referring to FIG. 4 to FIG. 6. FIG. 4 is a perspective view of the photographic conditions for the camera. FIG. 5 is a perspective view schematically showing the relationship of the image IM11 (FIG. 1) obtained by these photographic conditions and the target T. FIG. 6 is a schematic view of the image IM11.

In FIG. 4, the camera 50 captures the target T in the angle of view (the boundary shown by FF). The target T is provided with the reference point members 32, 34, and 36 showing the reference points. The target T is formed as a right angle L-shape having the reference points 32, 36 as end points and the reference point 34 as an angle. The length between the reference points 32 and 34 and the length between the reference points 34 and 36 are both the length LT (FIG. 5). Note that in the drawing, the point M shows the rear principal point position (camera position) of the photographic optical system of the camera 50, while the one-dot chain line O shows the optical axis of the camera 50.

As shown in FIG. 5, in the state of the image of the target T formed on the image plane F of the camera 50, the optical axis O passes through the camera position M and the photographic center C of the image plane F, while the image points p1, p2, and p3 of the reference points 32, 34, and 36 projected on the image plane F are positioned on the lines connecting the camera position M and the reference points 32, 34, and 36.

As shown in FIG. 5 and FIG. 6, a photographic coordinate system (Xp,Yp) having the photographic center C as its origin (0, 0) is defined for the image IM11 substantially matching with the image plane F. The two dimensional coordinates of the image points p1, p2, and p3 in this photographic coordinate system are respectively p1 (xp1, yp1), p2 (xp2, yp2), and p3 (xp3, yp3).

Further, in FIG. 5, the three-dimensional coordinate system having the camera position M as its origin (0,0,0) is defined as the camera coordinate system (Xc,Yc,Zc), the Xc axis and Yc axis are parallel to the Xp axis and Yp axis of the photographic coordinate system, and the Zc axis matches with the optical axis O.

If the three-dimensional coordinates of the reference points 32, 34, and 36 in the camera coordinate system are defined as Pci (Pcxi,Pcyi,Pczi) (where, i=1 to 3), the relationship between the image point, that is, the photographic coordinates pi (xpi,ypi), and the camera coordinates Pci (Pcxi,Pcyi,Pczi) of the reference point is shown by equation (1) and equation (2). Note that in equation (1) and equation (2), f is the focal distance of the camera 50:

$$xpi = f \times \frac{Pcxi}{Pczi} \quad (i = 1 \sim 3) \tag{1}$$

$$ypi = f \times \frac{Pcyi}{Pczi} \quad (i = 1 \sim 3) \tag{2}$$

Further, in FIG. 5, the three-dimensional coordinate system having the reference point 34 of the target T as its origin is set as the first scene coordinate system (Xs,Ys,Zs). The Xs axis and Zs axis of the first scene coordinate system run along the sides of the reference points 34, 32 and reference points 34, 36, while the Ys axis is perpendicular to the Xs axis and Zs axis. When the target T is placed on an inclined surface, the rotational angles (H4 of FIG. 3) of the Xs axis and Zs axis with respect to the horizontal plane are stored along with the image data. Due to this, the inclinations of the Xs axis and Zs axis are corrected. Therefore, the Ys axis is made to match with the perpendicular direction, while the Xs-Zs plane is made to match with the horizontal plane.

Here, if the coordinates of the camera position M in the first scene coordinate system are defined as $(\Delta X, \Delta Y, \Delta Z)$ and the inclination of the optical axis O as $(\alpha, \beta, \gamma)$, the relationship between the camera coordinates Pci (Pcxi,Pcyi,Pczi) and the scene coordinates Psi (Psxi,Psyi,Pszi) is shown by equation (3):

$$Pci = R \times (Psi - \Delta) \tag{3}$$

$$R = \begin{bmatrix} \cos\beta\cos\gamma & \cos\alpha\sin\gamma + \sin\alpha\sin\beta\cos\gamma & \sin\alpha\sin\gamma - \cos\alpha\sin\beta\cos\gamma \\ -\cos\beta\cos\gamma & -\cos\alpha\cos\gamma - \sin\alpha\sin\beta\sin\gamma & \sin\alpha\cos\gamma + \cos\alpha\sin\beta\sin\gamma \\ \sin\beta & -\sin\alpha\cos\beta & \cos\alpha\cos\beta \end{bmatrix} \tag{4}$$

Note that R in equation (3) is a rotational matrix and, as shown in equation (4), is displayed by the directional cosines $\cos\alpha$, $\cos\beta$, and $\cos\gamma$ of the optical axis O (Zc axis) Further, the $\Delta$ in equation (3) is the amount of displacement of the origin of the coordinates and matches with the scene coordinates $(\Delta X, \Delta Y, \Delta Z)$ of the camera position M.

In actuality, the reference point members 32, 34, and 36 are shown in white, while the target T is shown in black. When reading the image IM11 from the image storage medium 13 into the CPU 14, binary processing or other image processing is performed to automatically extract the reference points 32, 34, and 36 and find the photographic coordinates pi (xpi,ypi) (i=1 to 3). Further, the scene coordinates of the reference points 32, 34, and 36 in the first scene coordinate system are respectively Ps1 (-LT,0,0), Ps2 (0,0,0), and Ps3 (0,0,LT) (FIG. 5). From these values, using the successive approximate (or iteration) method, the camera position M $(\Delta X, \Delta Y, \Delta Z)$ in the scene coordinate system and the inclination $(\alpha, \beta, \gamma)$ of the optical axis O are calculated.

The six parameters of the camera position M $(\Delta X, \Delta Y, \Delta Z)$ and the inclination $(\alpha, \beta, \gamma)$ of the optical axis O are called the camera parameters in this specification. The camera parameters of the other image IM12 in the pair 1 are also found by the same technique as the camera parameters of the image IM11.

Next, the survey precision of the pair 1 is evaluated based on the camera parameters of the image IM11 and image IM12. To evaluate the survey precision, the vertical direction angle of view $\Theta v$ and horizontal direction angle of view $\Theta h$ of the camera 50 and the CCD resolution power rp of the camera 50 are further used. These three parameters are stored in the header H3 (photographic conditions) of FIG. 3. The above parameters are used to determine the valid mapping range and detailed area markers in the horizontal plane (Xs-Zs plane in the scene coordinate system).

Figure 7:
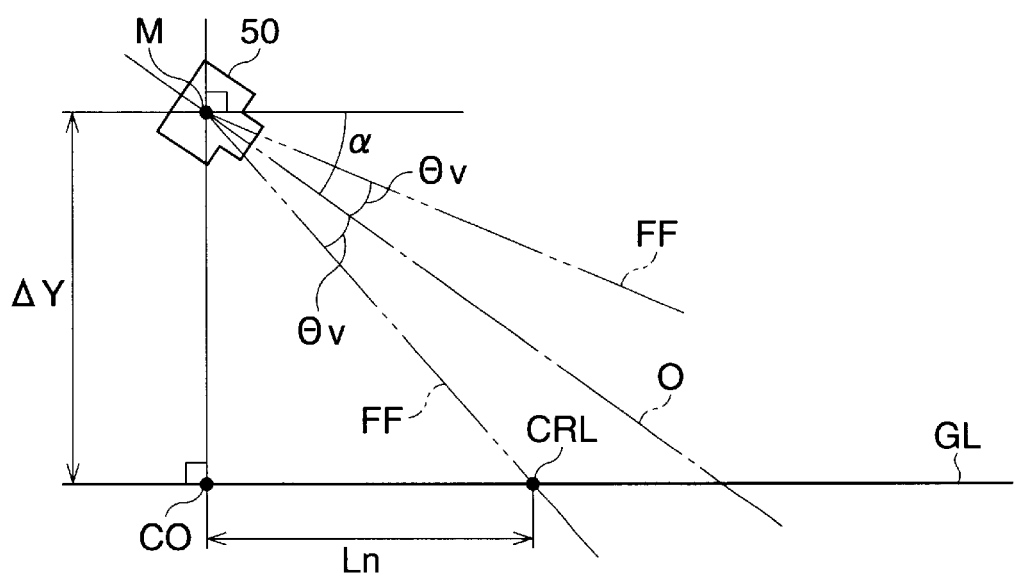
FIG. 7 is a schematic view of processing for determining a near limit of guaranteed precision to be found based on the image of FIG. 6 and showing the camera position and vertical direction angle of view.

FIG. 7 is a side standing view schematically showing the camera position M in a scene coordinate system and vertical direction angle of view $\Theta v$. In the drawing, the camera 50 is shown present at a position of a height $\Delta Y$ (Y component of $\Delta$) from the ground surface GL and the inclination of the optical axis O with respect to the Xs axis is shown as $\alpha$. Here, if the foot of the vertical line dropped from the camera 50 to the ground surface GL is defined as CO and the minimum length from the crossing line CRL of the boundary FF of the angle of view and ground surface to the foot CO of the vertical line is defined as Ln, a sufficient survey precision cannot be obtained in an area nearer the camera 50 than Ln. This Ln, that is, the near limit of guaranteed precision, is calculated from equation (5):

$$Ln = \Delta Y \times \cot(\alpha + \Theta v) \quad (5)$$

Figure 8:
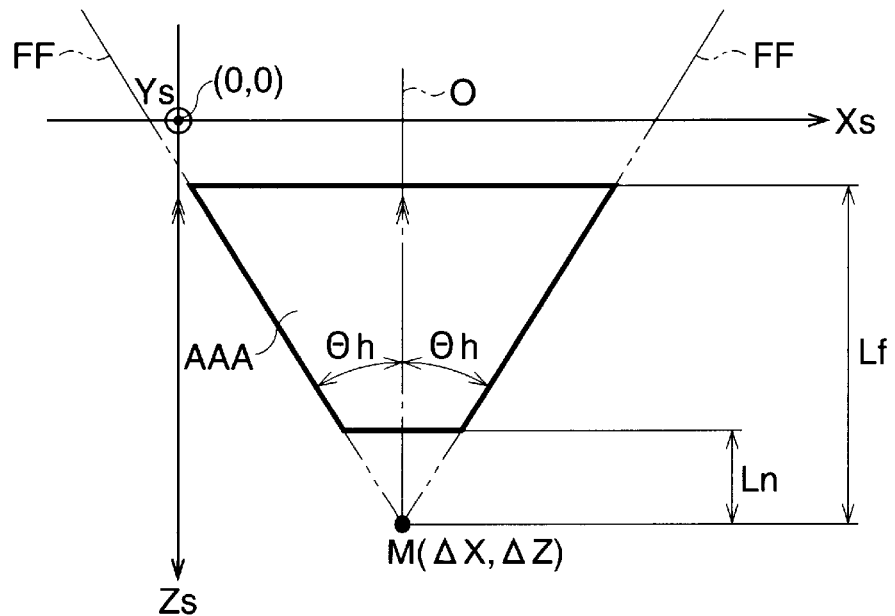
FIG. 8 is a plan view of a range of guaranteed precision found based on the image of FIG. 6.

FIG. 8 is a plan view of the range of guaranteed precision for one camera. The camera position M ($\Delta X, \Delta Y$), near limit Ln of guaranteed precision, optical axis O, and angle of view boundary FF are shown on an Xs-Zs plane of the scene coordinate system having the reference point 34 as its origin. As explained with reference to FIG. 1, a pair of images is selected to be used for the mapping as the paired images. Here, if the distance (reference line length) between the two camera positions M is B and the allowable error AE is set to a predetermined value, the far limit Lf of the distance enabling guarantee of precision (far limit of guaranteed precision) is calculated from equation (6):

$$Lf = \sqrt{\frac{AE \cdot B \cdot f}{rp}} \quad (6)$$

If the area spread by exactly the horizontal direction angle of view $\Theta h$ from the optical axis O is delineated by the near limit Ln of guaranteed precision and the far limit Lf of guaranteed precision, the trapezoidal area extending from the camera position M toward the far side, that is, the range of guaranteed precision AAA, is obtained.

The allowable error AE may be suitable changed. When desiring to obtain a high precision survey map, it is set to a small value. In this case, the far limit Lf of guaranteed precision becomes small and the range of guaranteed precision AAA also shrinks. Conversely, when not such a high precision of the survey map is demanded, the allowable error AE is set to a large value, whereby the range of guaranteed precision AAA is expanded.

Figure 9:
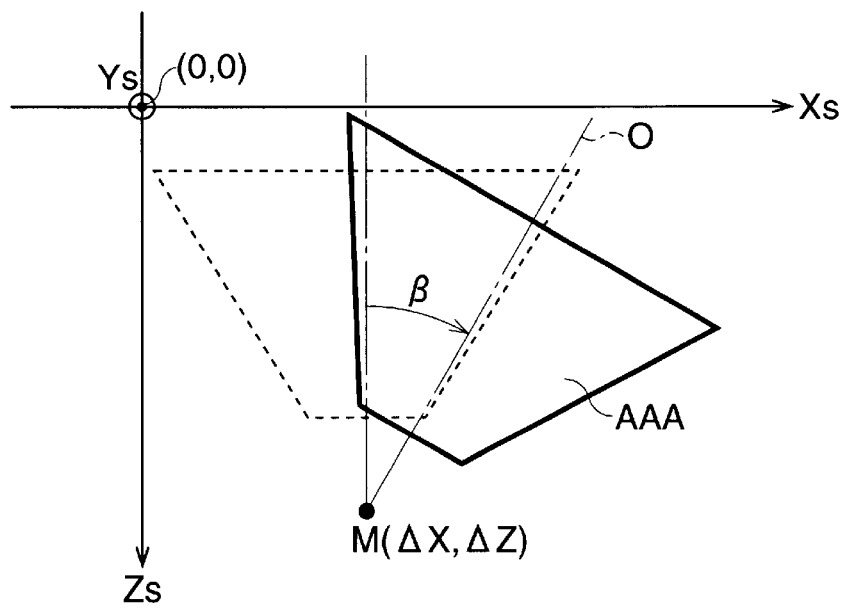
FIG. 9 is a schematic view of the state of rotation of the range of guaranteed precision shown in FIG. 8.

In FIG. 8, the optical axis O is deemed as (approximated as) being parallel to the Zs axis, but considering the rotation of the optical axis O around the Ys axis, as shown in FIG. 9, the range of guaranteed precision AAA is rotated exactly by the angle $\beta$ about M ($\Delta X, \Delta Y$).

The range of guaranteed precision AAA is calculated for every image and two ranges of guaranteed precision AAA are obtained for each paired images. One valid mapping range and detailed area marker are determined based on these two ranges of guaranteed precision AAA. Note that in the present embodiment, the range of guaranteed precision AAA is found by computation, but it is also possible to determine the range of guaranteed precision AAA by the operator determining the limits Ln, Lf of guaranteed precision and angle of view $\Theta h$ to any values.

Figure 10:
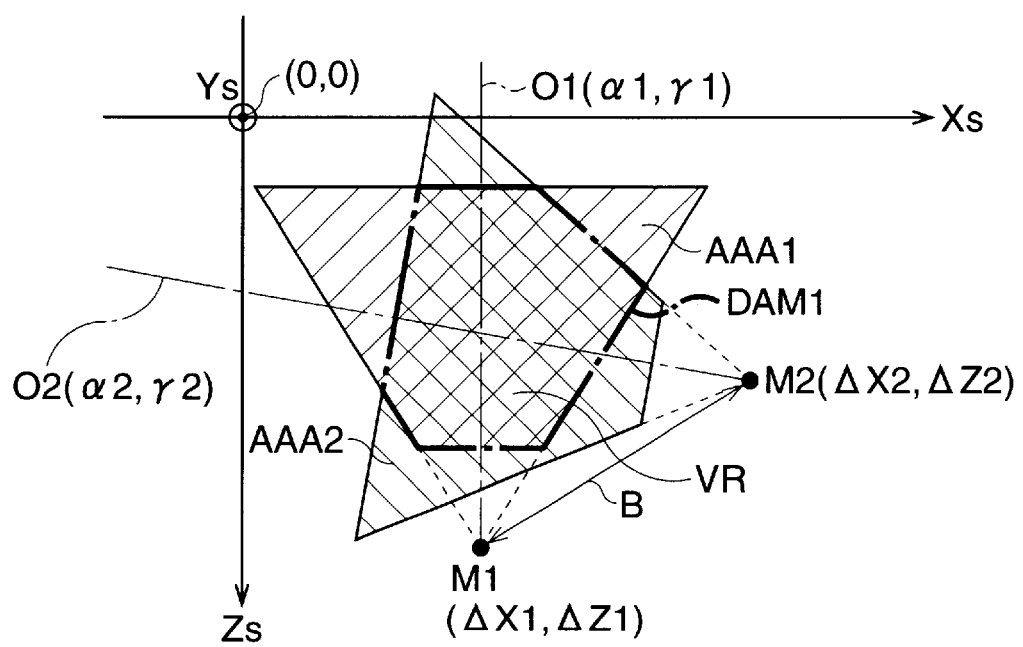
FIG. 10 is a schematic view of the processing for determining a detailed area marker from two ranges of guaranteed precision.

FIG. 10 is a schematic view of processing for generation of the detailed area marker DAM1 of the pair 1 and an Xs-Zs plan view of the scene coordinate system. Here, to differentiate the image IM11 and image IM12, "1" and "2" are attached after the references indicating the camera parameters and ranges of guaranteed precision. The two camera positions corresponding to the images IM11 and IM12 are shown by M1 ($\Delta X1, \Delta Z1$) and M2 ($\Delta X2, \Delta Z2$), while the optical axes are shown by O1 ($\alpha1, \gamma1$) and O2 ($\alpha2, \gamma2$). The same drawing has the ranges of guaranteed precision AAA1 and AAA2 present in a superimposed state. The overlapping area of the two ranges of guaranteed precision AAA1 and AAA2 is determined as the valid mapping range VR, while its boundary is determined as the detailed area marker DAM1. Inside the detailed area marker DAM1, the precision is guaranteed when using the survey results of the two images together and a high precision survey map can be prepared.

Note that the detailed area marker DAM1 is produced as follows: that is, the ranges of guaranteed precision AAA1 and AAA2 are produced in advance as label images and predetermined new label values are generated for the scene coordinates where significant label values (label values not background pixels) are present in both of the two ranges of guaranteed precision AAA. Further, the graphic produced by the new label values is determined as the valid mapping range VR and its boundary (in the drawing, shown by the thick one-dot chain line) is determined as the detailed area marker DAM1.

For the pair 1, one detailed area marker DAM1 is calculated for two images IM11 and IM12. Similarly, the detailed area markers DAM2 to DAM9 (not shown) are calculated for the pairs 2 to 9. These detailed area markers DAM1 to DAM9 are obtained displayed as the area markers AM1 to AM9 of FIG. 1, but as explained above, the detailed area markers DAM exhibit hexagonal shapes and the direction of the optical axis is hard to discern. Therefore, the detailed area marker DAM1 is displayed as the area marker AM1 for only the mapping, that is, the pair 1 including in the area the physical points to be designated for mapping, while the simple area markers as shown in FIG. 11 are displayed as the area markers AM2 to AM9 for the pairs 2 to 9 not for mapping.

Figure 11:
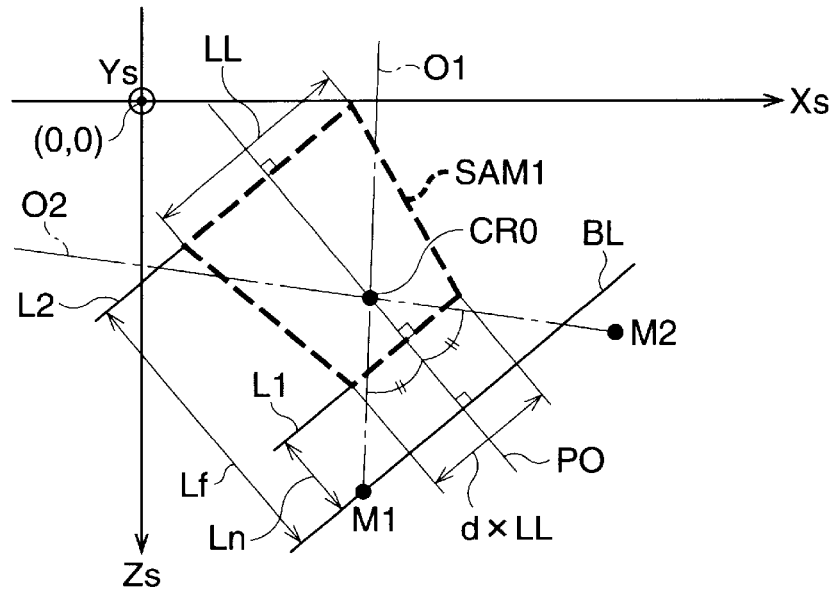
FIG. 11 is a schematic view of the conditions for calculating a simple area marker.

FIG. 11 is a schematic view of the method of generation of the simple area marker SAM1 of the pair 1 and a Xs-Zs plan view of the first scene coordinate system. The two camera positions corresponding to the images IM11 and IM12 are shown by M1 and M2. The projections of the optical axes O1 and O2 on the Xs-Zs plane intersect at the crossing point CR0 on the physical point side. The bisector of the angle of intersection at the crossing point CR0 is determined as the provisional optical axis P0.

Ln and Lf are calculated based on the camera position M1 closest to the crossing point CR0 in terms of the distance along the provisional optical axis P0. On the Xs-Zs plane, the parallel lines L1 and L2 of the lengths Ln and Lf are taken starting from the line BL perpendicular to the provisional optical axis P0 through the camera position M1 and parallel line segments symmetrical to the optical axis P0 are cut out from the parallel lines. The lengths of the line segments are preset and the line segments of the length LL from the parallel line L2 and the length d×LL from the parallel line L1 (0<d<1) are cut out. For example, d=0.7. As shown in FIG. 11, the boundary (in the figure, shown by the thick one-dot chain line) of the trapezoid obtained by connecting the end points of the two parallel line segments is determined as the simple area marker SAM1. Note that the camera position 2 may also be used as a reference.

Figure 12:
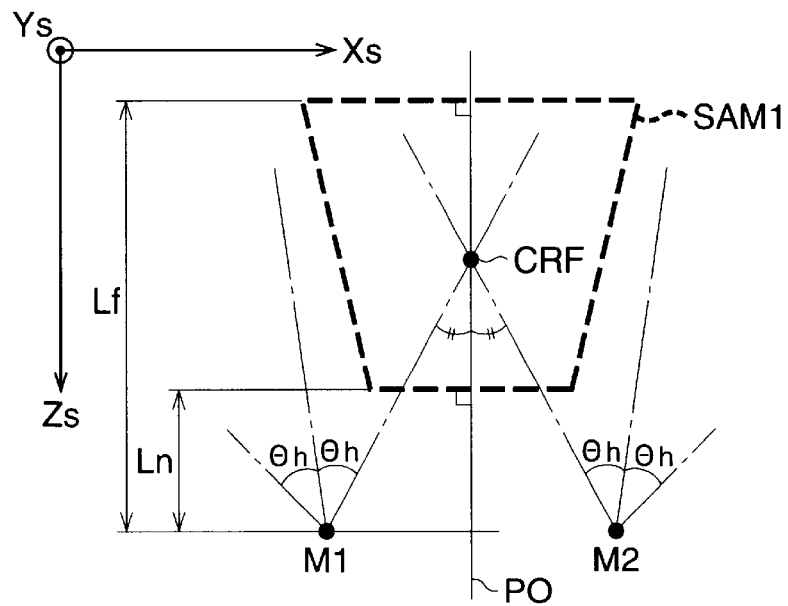
FIG. 12 is a schematic view of the conditions for calculating another simple area marker.

In FIG. 11, the optical axes O1 and O2 intersect, but when O1 and O2 do not intersect on the physical point side, as shown in FIG. 12, the provisional optical axis PO similar to FIG. 11 is set for the crossing point CRF of the lines along the angle of view Θh of the optical axes O1 and O2.

In this way, the simple area markers SAM2 to SAM9 are calculated for the pairs 2 to 9 not for mapping and displayed as the area markers AM2 to AM9 in the drawing area DRA.

Note that as the simple area markers SAM, in addition to the above shape, a polygonal shape obtained by connecting the intersecting points of the optical axes, a trapezoid having as a line of symmetry a vertical bisector of the line connecting two photographing positions, a minimum circumscribed circle including all camera positions, a rectangle including all camera positions, etc. may also be employed.

The scene coordinate systems, however, are based on the individual target positions RP1, RP2, and RP3 and are separate coordinate systems. Specifically, the area markers AM1 to AM3 are displayed by the first scene coordinate system having the target position RP1 (FIG. 1) as an origin, the area markers AM4 to AM6 are displayed by the second scene coordinate system having the target position RP2 as an origin, and the area markers AM7 to AM9 are displayed by the third scene coordinate system having the target position RP3 as an origin.

Therefore, to display all of the area markers AM1 to AM9 in the single drawing area DRA shown in FIG. 1, it is necessary to standardize the coordinate systems of all the images. Here, the first scene coordinate system is determined as the reference coordinate system and the other second and third scene coordinates are converted.

Figure 13:
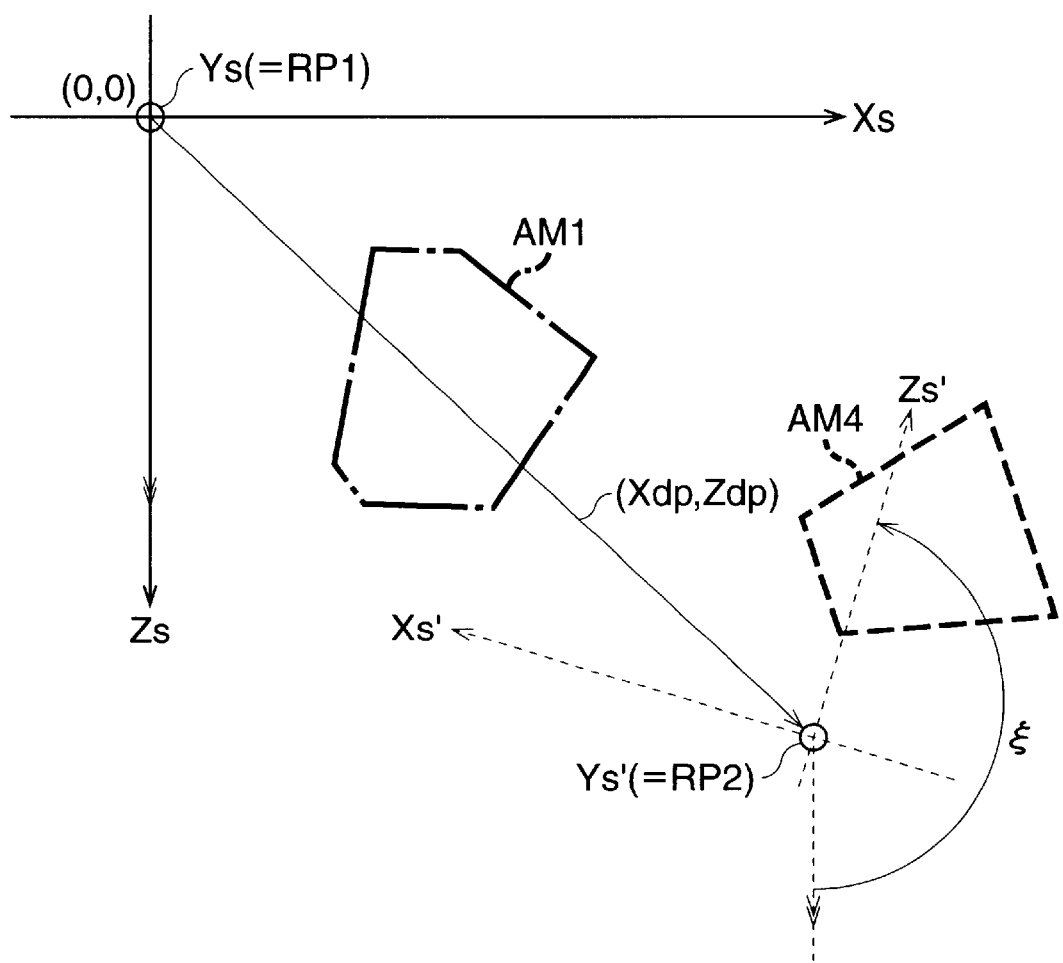
FIG. 13 is a schematic view of the state of converting one scene coordinate system to a reference coordinate system.

FIG. 13 is a schematic view of the state of conversion of the coordinates of the area marker AM4 (Xs, Zs) of the second scene coordinate system (Xs', Zs') to the reference coordinate system. The amount of relative displacement from the target position RP1 to the target position RP2 is shown by (Xdp, Zdp), while the angle of rotation of the Xs' axis with respect to the Xs axis (or the Zs' axis with respect to the Zs axis) is shown by $\xi$. The equation for conversion is shown by equation (7). Note that the amount of relative displacement and angle of rotation are found based on the parameters stored in the header H:

$$\begin{bmatrix} Xs \\ Zs \end{bmatrix} = \begin{bmatrix} \cos\zeta & -\sin\zeta \\ \sin\zeta & \cos\zeta \end{bmatrix} \begin{bmatrix} Xs' \\ Zs' \end{bmatrix} + \begin{bmatrix} Xdp \\ Zdp \end{bmatrix} \quad (7)$$

Due to this conversion of coordinates, the area marker AM4 can be displayed by the reference coordinates (Xs,Zs). The area markers AM5 to AM9 are converted in coordinates in the same way. Note that when there is displacement of the target position RP2 in the perpendicular direction to the target position RP1, suitable correction is performed based on the parameters stored in the header H, but this is actually a negligible amount of error.

Due to the above processing, it is possible to display all area markers AM1 to AM9 in one drawing area DRA (FIG. 1), therefore the relative positional relationship of all pairs can be easily discerned.

With reference to the flow charts of FIG. 14, FIGS. 15A and 15B, and FIGS. 16A and 16B, and FIG. 17, the processing routine for display of the drawing area executed at the CPU 14 (FIG. 2) will be explained below.

Figure 14:
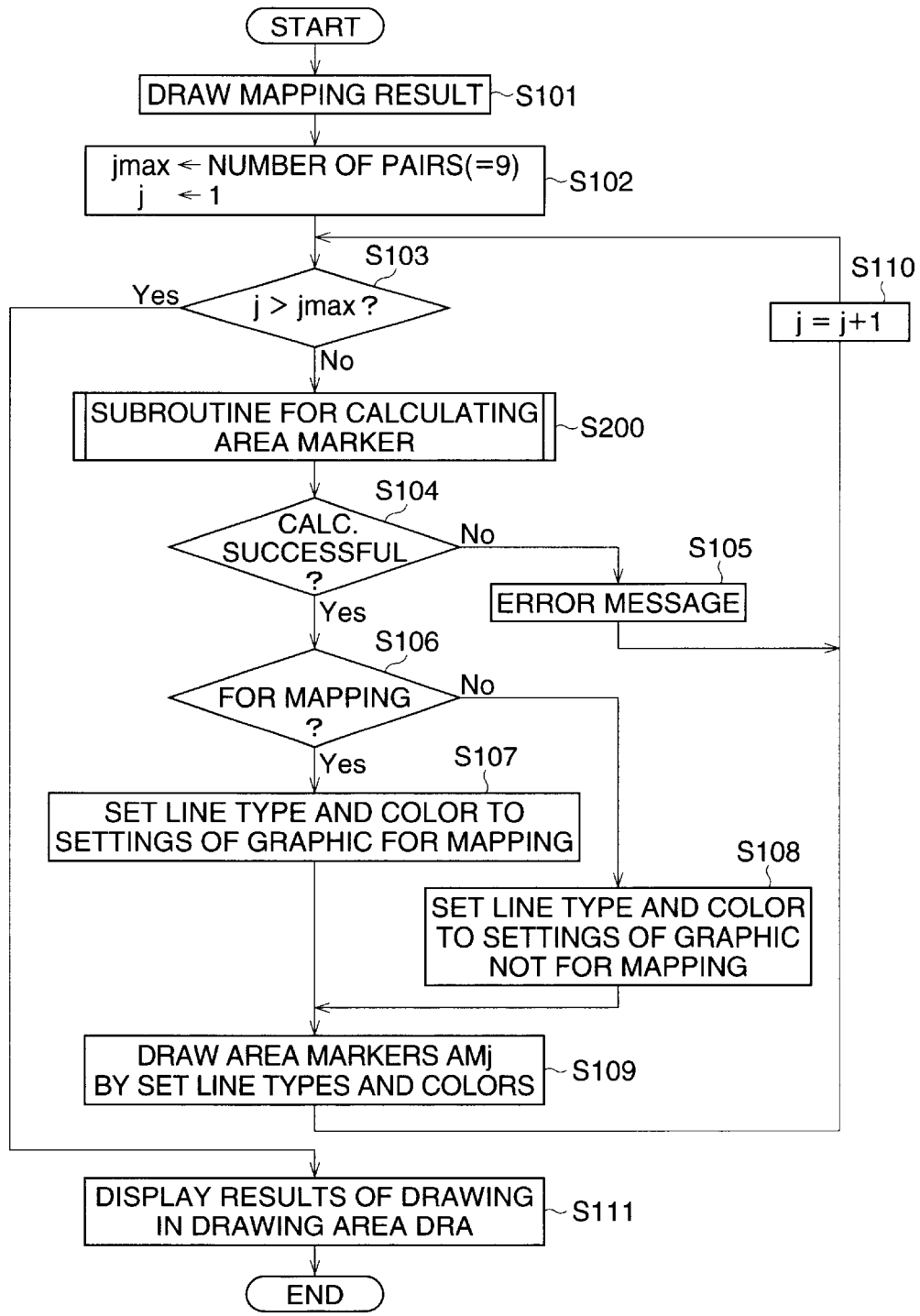
FIG. 14 is a flow chart of a processing routine for displaying a drawing area executed in a CPU.

FIG. 14 is a flow chart of the overall routine for displaying the drawing area. This processing routine for displaying the drawing area is executed after the entire photo data (18 images worth) is read from the image storage medium 13, nine paired images are defined manually, and the camera parameters corresponding to the 18 images are calculated and stored in the work memory 19. The information of the header H of the photographic data is also stored in the work memory 19.

First, at step S101, when there is an already made survey map, the data of that survey map is stored in the display memory 20 (FIG. 2). Then, at step S102, the number of pairs (=9) of the already defined paired images is entered for the maximum value jmax and the loop counter j is set to the initial value "1".

At step S103, it is judged whether the loop counter j is larger than the maximum value jmax. When the loop counter j is not more than the maximum value jmax, the routine proceeds to step S200, while when the loop counter j is larger than the maximum value jmax, the routine proceeds to step S111.

At step S200, the subroutine for calculating an area marker (FIGS. 15A and 15B) is executed and the area marker AMj is calculated for the j-th paired images (pair j). Here, when the two ranges of guaranteed precision AAA to define the detailed area marker DAMj do not overlap etc., the area marker AMj sometimes cannot be calculated. Therefore, at step S104, it is judged whether the calculation of the area marker at step S200 was successful or not. When not successful, an error message is displayed on the screen (step S105), the operator confirms it, the loop counter j is incremented by exactly "1" at step S110, and it is judged at step S103 whether the loop counter j has exceeded the maximum value jmax, that is, whether the processing for drawing the area marker AMj (j=1 to jmax) has been completed for all paired images.

If it is judged at step S104 that the calculation of the area marker has succeeded, step S106 is executed. Here, it is judged if the area marker AMj is for mapping. An area marker for mapping is designated by selection of the paired images by the operator in advance. When the operator does not designate anything in particular, the mapping is set to the 1st paired images, that is, the pair 1.

When for mapping, step S107 is executed, where the area marker AMj is set to a mode different from the other area markers, for example, a one-dot chain line type (FIG. 1) and a red color. When not for mapping, step S108 is executed, where the area marker AMj is set to the normal mode, for example, a broken line type (FIG. 1) and a blue color. Then, step S109 is executed, where the area marker AMj is drawn superimposed over the result of drawing of the display memory based on the settings of step S107 or step S108, then step S110 and step S103 on are executed again.

By repeatedly executing step S103 to step S109 for exactly jmax times, the area markers are successively drawn on the survey map (only when present) in the display memory 20 in the order of AM1, AM2, ... AM9. When it is judged at step S103 that the processing has been finished for drawing the area markers for all of the jmax (=9) paired images, at step S111 the results of the drawing of the display memory 20, that is, the survey map and all the area markers AM1 to 9, are displayed in the drawing area DRA of FIG. 1 and the processing routine for display of the drawing area ends.

Note that the mode of an area marker is shown by the one-dot chain line and broken line, but is not limited to this. The inside of the area marker may also be painted out. Further, whether something is for mapping or not for mapping is differentiated by the type of lines, but may also be differentiated by the line width. Further, the type of line and line width may both be set differently. These types of settings may be suitably changed at the display terminal DT (FIG. 1) by the operator.

Figure 15A:
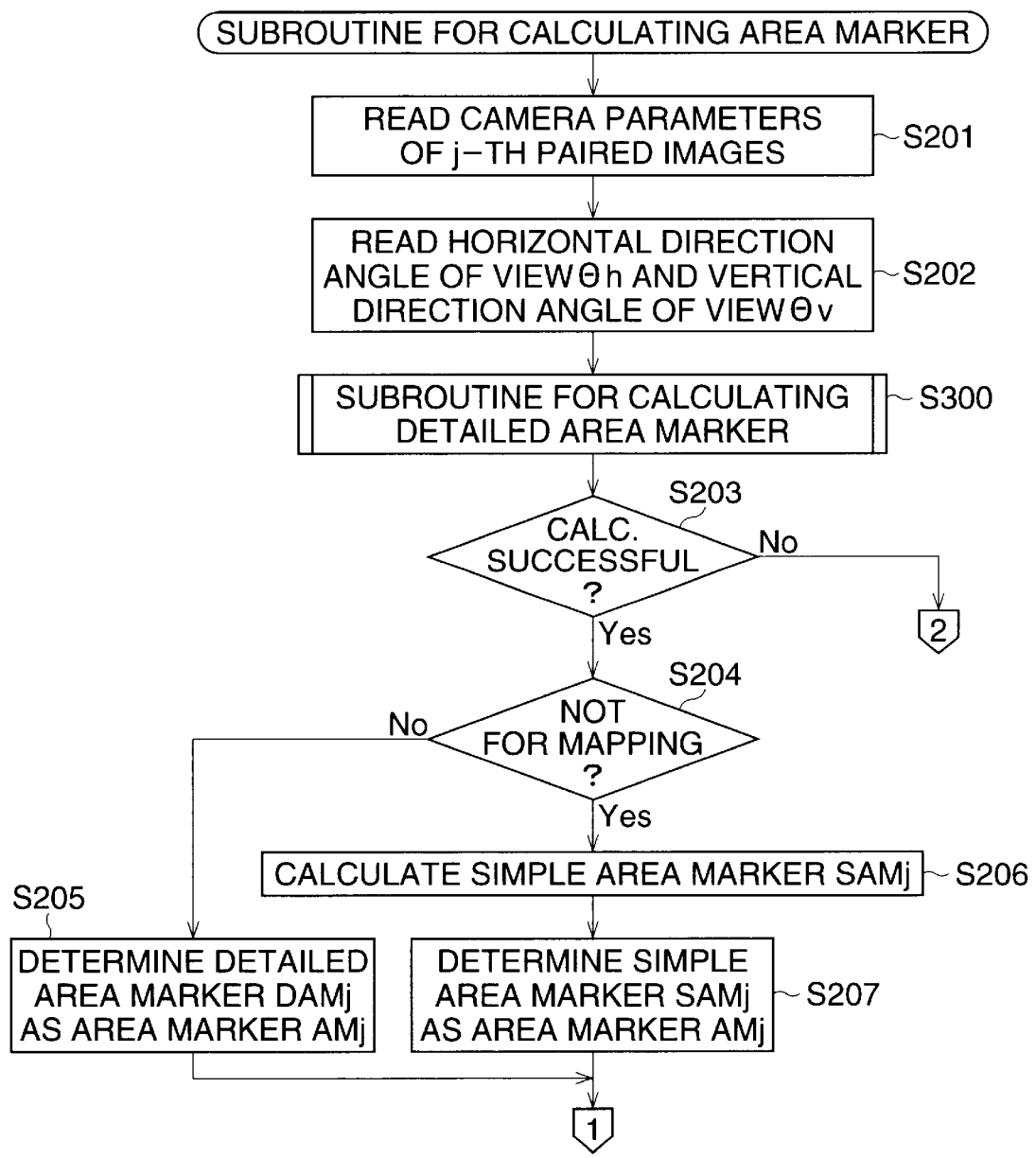
FIGS. 15A and 15B are flow charts of a subroutine for calculating an area marker.
Figure 15B:
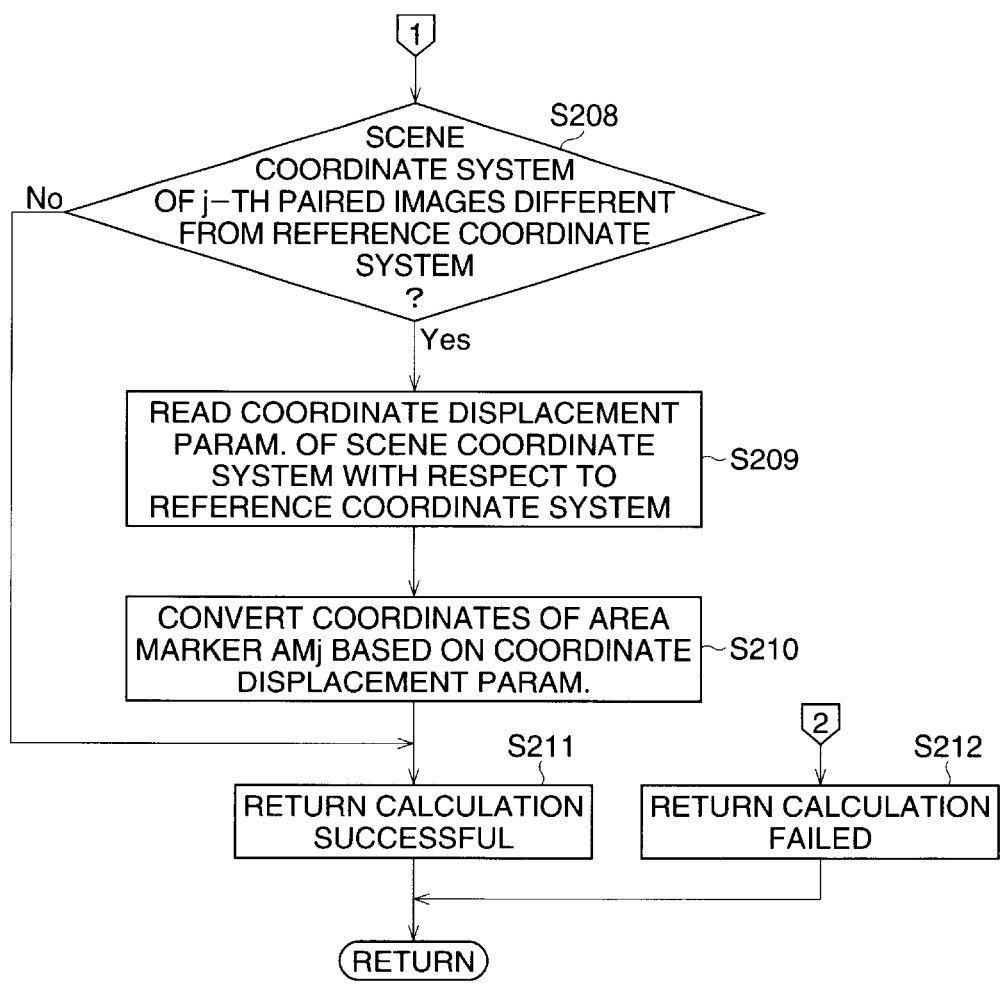

FIGS. 15A and 15B are flow charts showing details of the subroutine for calculating an area marker executed at step S200 of FIG. 14. This subroutine for calculating an area marker is executed at the area computing controller 43 of the CPU 14.

First, at step S201, the camera parameters of the two images stored in the work memory 19, that is, the camera positions M and inclination of the optical axis O, are read for the j-th paired images. At step S202, the horizontal direction angle of view $\Theta h$ and vertical direction angle of view $\Theta v$ of the camera are read.

Then, the subroutine for calculating a detailed area marker (FIGS. 16A and 16B) of step S300 is executed, so that a detailed area marker DAMj is calculated based on the two ranges of guaranteed precision AAA. At step S203, it is judged whether the calculation was successful based on the result of calculation of the detailed area marker by step S300. If the calculation of the detailed area marker failed, the return value of failure of calculation is returned at step S212, the subroutine for calculating the area marker ends, and the processing routine for display of the drawing area (FIG. 14) is returned to.

If it is judged at step S203 that the calculation succeeded, it is judged at step S204 whether the area marker AMj is for mapping. If for mapping, step S205 is executed and the detailed area marker DAMj (FIG. 10) calculated at step S300 is determined as the area marker AMj. Conversely, when not for mapping, step S206 is executed and the simple area marker SAMj is calculated. Further, at step S207, the simple area marker SAMj is determined as the area marker AMj in place of the detailed area marker DAMj. Due to this, the direction of the optical axis of the camera becomes clear and the content of the display of the drawing area DRA becomes easy to understand.

Then, at step S208, it is judged whether the scene coordinate system found by the j-th paired images is different from the reference coordinate system found by the first paired images. Specifically, it is judged whether the target T has moved by the identification number H2 (FIG. 3) attached to the paired images. If the target T has moved, it is judged that the scene coordinate system is different from the reference coordinate system.

When it is judged at step S208 that the j-th scene coordinate system is different from the reference coordinate system, the required coordinate displacement parameters (Xdp,Zdp,ζ) are read from the work memory 19 at step S209 and the reference coordinate system is standardized by the coordinate conversion shown in FIG. 13. Further, at step S210, the coordinates of the area marker AMj are converted based on the coordinate displacement parameters.

When it is judged at step S208 that the j-th scene coordinate system is the same as the reference coordinate system, or when the coordinate transformation has ended at step S210, the return value showing that the calculation has succeeded is returned at step S211 and the processing routine for display of the drawing area (FIG. 14) is returned to.

Figure 16A:
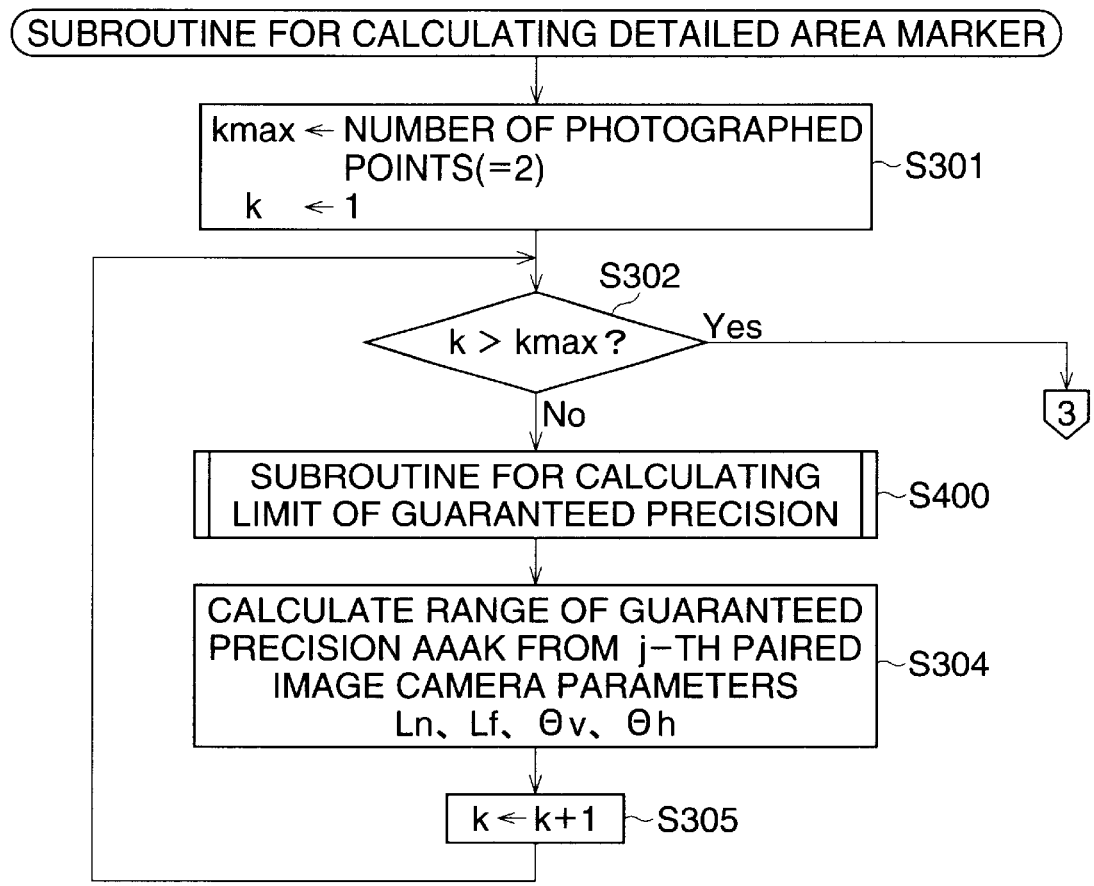
FIGS. 16A and 16B are flow charts of a subroutine for calculating a detailed area marker.
Figure 16B:
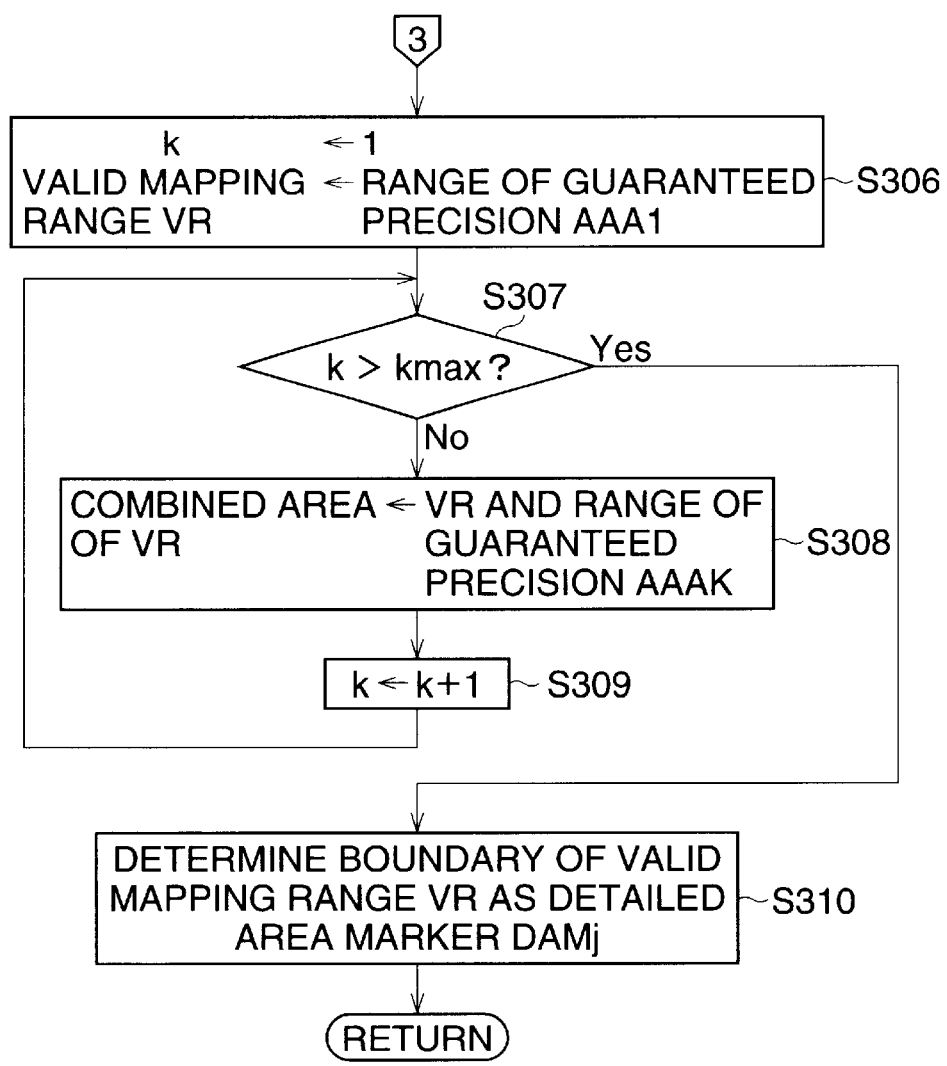

FIGS. 16A and 16B are flow charts showing details of a subroutine for calculating a detailed area marker executed at step S300 of FIG. 15A.

First, at step S301, the number of photographed points, that is, the number (=2) of ranges of guaranteed precision AAA to be superimposed, is entered for the maximum value kmax and the loop counter k is set to the initial value "1".

At step S302, it is judged whether the loop counter k has reached the maximum value kmax. When it has not reached the maximum value kmax, the subroutine for calculating the limit of guaranteed precision (FIG. 17) of step S400 is executed and the near limit of guaranteed precision Lnk and the far limit of guaranteed precision Lfk are calculated.

Further, at step S304, the range of guaranteed precision AAAk is calculated based on the parameters ($\Delta Xk$, $\Delta Yk$, $\Delta Zk$, $\Delta Zk$, $\alpha k$, $\beta k$, $\gamma k$, $\Theta h$, $\Theta v$) read at steps S201 and S202 and the parameters (Lnk, Lfk) found at step S400. At step S305, the loop counter k is incremented by exactly "1" and the routine from step S302 is reexecuted. In this way, the two ranges of guaranteed precision AAA1 and AAA2 corresponding to the j-th image pair are obtained by step S302 to step S305.

When it is judged at step S302 that all of the ranges of guaranteed precision have finished being calculated, step S306 is executed. The loop counter k is returned again to the initial value "1" and the range of guaranteed precision AAA1 is set as the initial value of the valid mapping range VR.

At step S307, it is judged whether the loop counter k has reached a maximum value kmax or not. If the maximum value kmax has not been reached, at step S308, a combined area comprised of the range of guaranteed precision AAAk superimposed on the valid mapping range VR is set as the new valid mapping range VR. At step S309, the loop counter k is incremented and step S307 on are again executed. In this way, by step S307 to step S309, the combined area comprised of the two ranges of guaranteed precision AAA1 and AAA2 corresponding to the j-th image pair superimposed is determined as the valid mapping range VR.

When it is judged at step S307 that the loop counter k has reached the maximum value kmax, at step S310, the boundary of the valid mapping range VR is determined as the detailed area marker DAMj, the subroutine for calculating the detailed area marker is ended, and the routine returns to step S200 of FIG. 15A.

Figure 17:
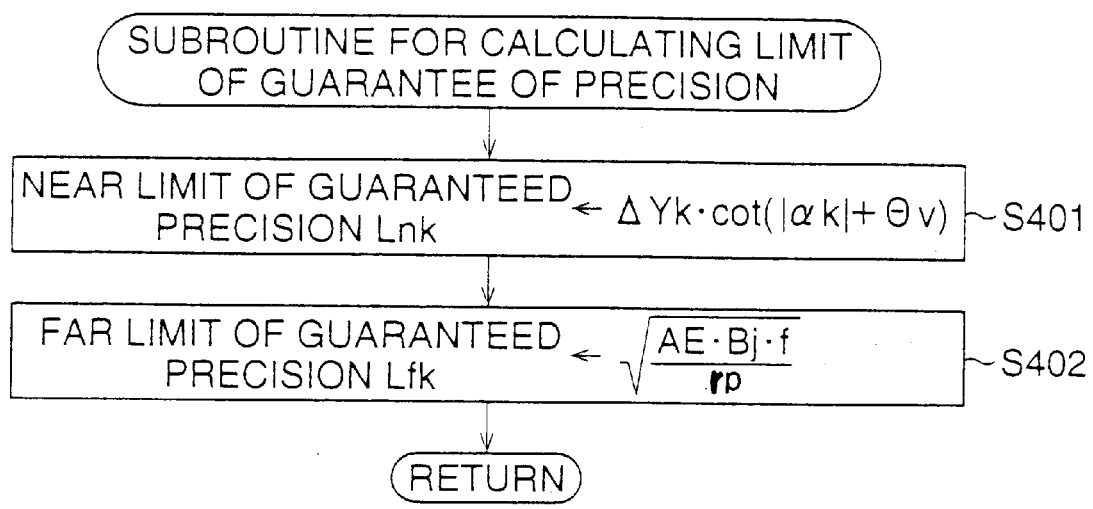
FIG. 17 is a flow chart of a subroutine for calculating a limit of guaranteed precision.

FIG. 17 is a flow chart showing details of the subroutine for calculating a limit of guaranteed precision executed at step S400 in FIG. 16A. When calculating the range of guaranteed precision AAAk, first, at step S401, Lnk is calculated by equation (5) (FIG. 7), then, at step S402, Lfk is calculated by equation (6) (FIG. 8).

According to the photogrammetric image processing apparatus of the first embodiment, valid mapping ranges (area markers) guaranteeing precisions of designation of physical points are found for the plurality of paired images and displayed on the screen in a single drawing area DRA. Therefore, physical points can be designated easily at a high precision by designating physical points in the area markers.

Further, since all area markers are displayed throughout the entire survey range for finding the survey map, physical points can be designated while confirming the entire survey range. Therefore, it is possible to designate physical points through different area markers and eliminate unnecessary designation of physical points, for example, designation of a point on the line L1 in FIG. 1.

In this way, according to the first embodiment, there is gained the superior effect that the manual work in the photogrammetric image processing apparatus can be greatly increased in efficiency.

A second embodiment of the present embodiment will be explained below. In the second embodiment, there are four images including a common target T. This embodiment is substantially the same as the first embodiment except that these four images are defined as a single group. Explanations of parts of the configuration the same as in the first embodiment are omitted. While not shown, the image display area IMA displays the four images of the group in parallel.

Figure 18:
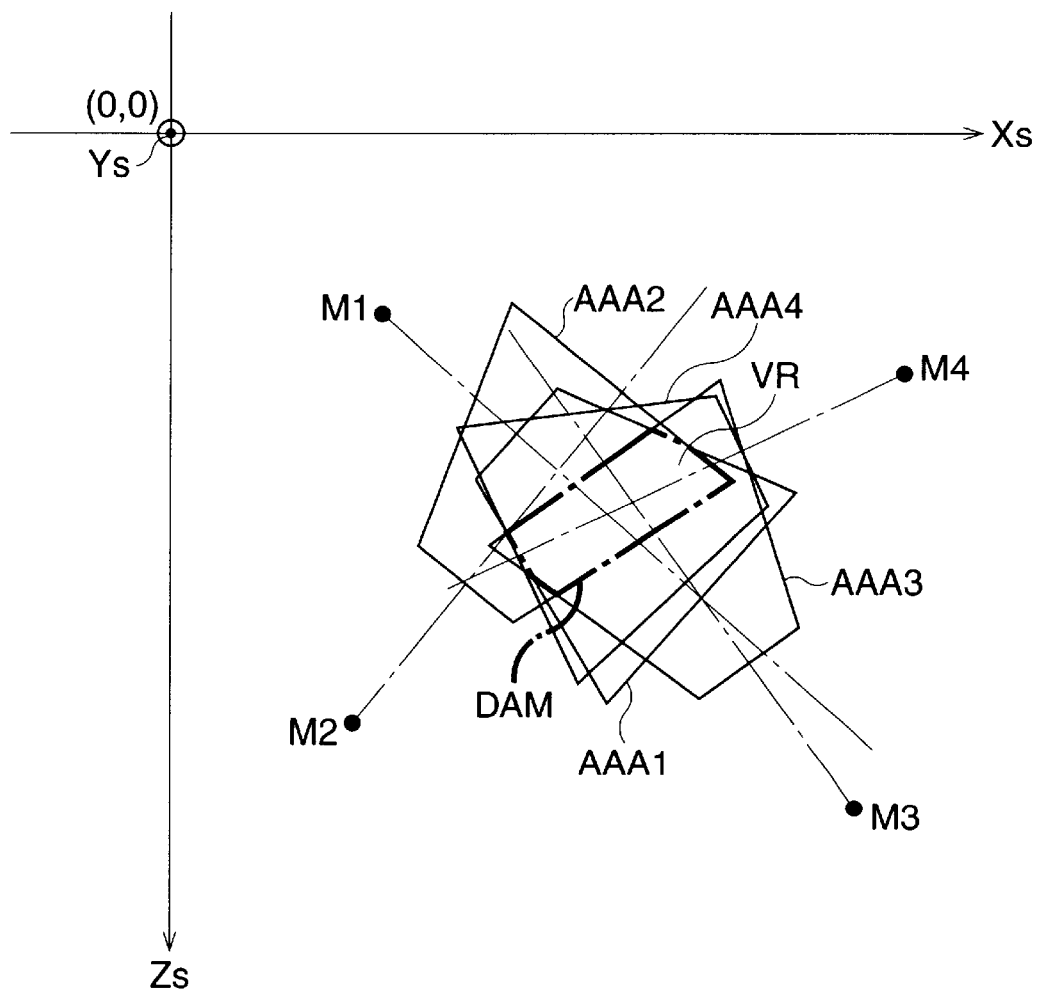
FIG. 18 is a schematic view of a photogrammetric image processing apparatus according to a second embodiment of the present invention for determining a detailed area marker from four ranges of guaranteed precision.

FIG. 18 is a view of the state of calculating a detailed area marker from the four ranges of guaranteed precision and corresponds to FIG. 10 in the first embodiment. First, the ranges of guaranteed precision AAA1 and AAA2 at the camera positions M1 and M2 are determined and the ranges of guaranteed precision AAA3 and AAA4 at the camera positions M3 and M4 are determined. The technique for finding two ranges of guaranteed precision from two images is the same as in the first embodiment.

The boundary of the overlapping area of all of these four ranges of guaranteed precision AAA1, AAA2, AAA3, and AAA4 is determined as the detailed area marker DAM.

Figure 19:
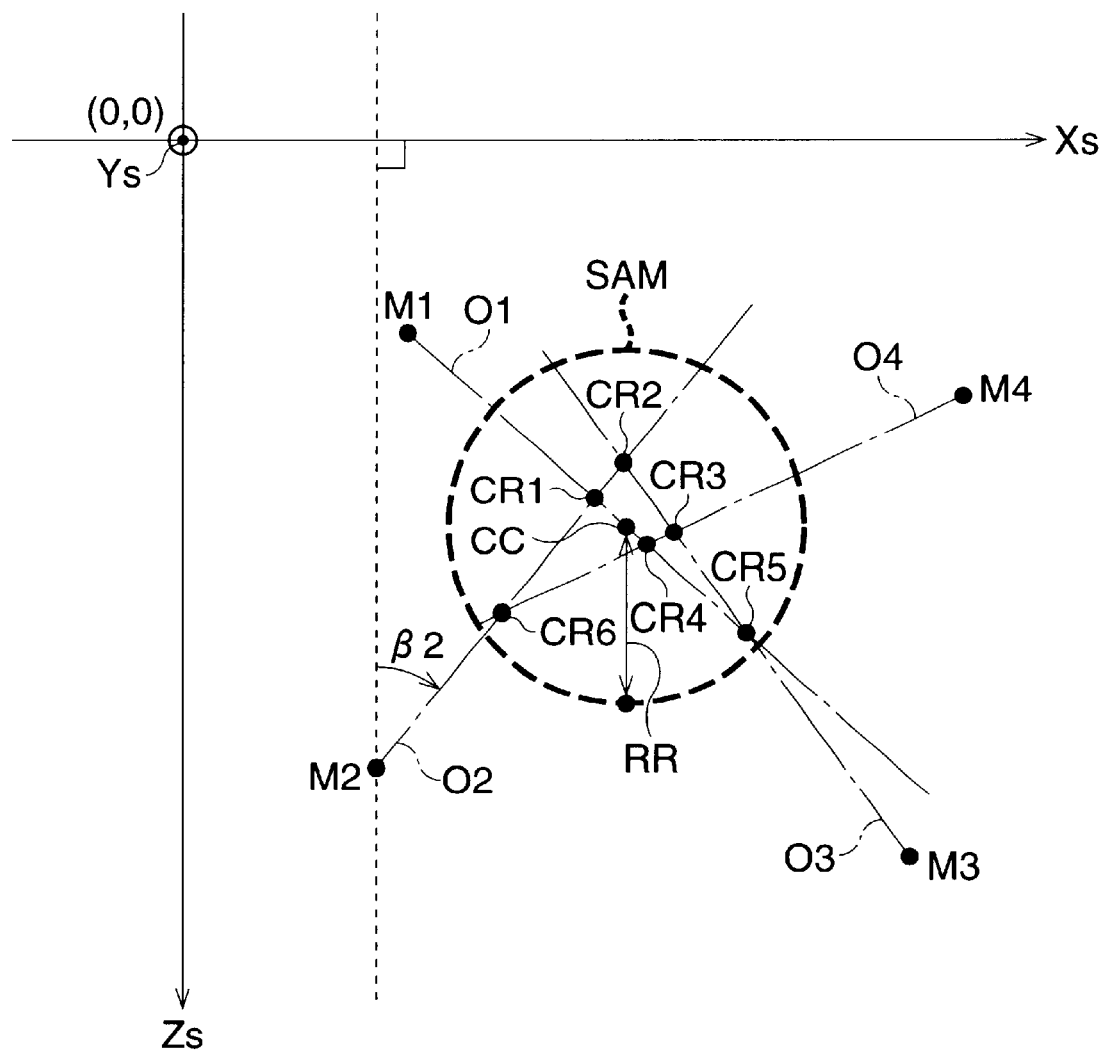
FIG. 19 is a schematic view of the conditions for calculating a simple area marker in the second embodiment.

FIG. 19 is a view of the state of calculating a simple area marker and corresponds to FIG. 11 (or FIG. 12) of the first embodiment. In the second embodiment, the shape of the simple area marker SAM is circular.

The camera positions corresponding to the four images are shown as M1, M2, M3, and M4 and the optical axes as O1, O2, O3, and O4. The crossing points of the optical axes O1 to O4 are all extracted. In FIG. 19, the optical axes O1 and O2 intersect at the crossing point CR1, the optical axes O2 and O3 intersect at the crossing point CR2, the optical axes O3 and O4 intersect at the crossing point CR3, the optical axes O4 and O1 intersect at the crossing point CR4, the optical axes O1 and O3 intersect at the crossing point CR5, and the optical axes O2 and O4 intersect at the crossing point CR6.

The arithmetic average of the coordinates of these crossing points CR1, CR2, CR3, CR4, CR5, and CR6 is determined as the provisional center CC. The boundary of the circle having the provisional center CC as its center and having a radius of the predetermined value RR is determined as the simple area marker SAM.

According to the second embodiment, like in the first embodiment, there are gained the superior effects that since an area enabling high precision designation of a physical point (area marker AM) is displayed in the drawing area DRA, the manual work in the photogrammetric image processing apparatus can be greatly increased in efficiency and a high precision survey map can be obtained.

In the above way, according to the present invention, the range of guaranteed precision is calculated from the positional relation with the camera for each image, enclosures showing the ranges of guaranteed precision (area markers AM) for the plurality of images including a predetermined target are displayed superimposed on the survey map, and physical points are designated in the area markers AM, so there is gained the superior effect that the manual work in the photogrammetric image processing apparatus can be greatly increased in efficiency.

The present disclosure relates to subject matter contained in japanese patent application no. 11-169969 (filed on Jun. 16, 1999) which is expressly incorporated herein, by reference, in its entirety.

What is claimed is:

1. A photogrammetric image processing apparatus that utilizes a group comprising a plurality of images, each image commonly including a target at a predetermined position, that calculates a position of a camera taking each image and an inclination of an optical axis of the camera for each image, that designates a common physical point in each image, calculates three-dimensional coordinates of the physical point, and that generates a survey map based on the three-dimensional coordinates, said photogrammetric image processing apparatus comprising:

an area computing processor that calculates a valid mapping range based on the camera positions and the optical axis inclinations for the plurality of images in the group and that generates an area marker based on the valid mapping range, the valid mapping range enabling designation of the physical point for making the survey map, and a display processor that displays the area marker on a screen of a display device, the area marker being superimposed on the survey map.

2. The apparatus as set forth in claim 1, wherein said area computing processor calculates ranges of guaranteed precision respectively corresponding to the plurality of images in the group and determines an overlapping area of the ranges of guaranteed precision as the valid mapping range.

3. The apparatus as set forth in claim 2, wherein the ranges of guaranteed precision are respectively recorded as label images comprising pixel values, and the overlapping area is determined based on the pixel values of the label images.

4. The apparatus as set forth in claim 2, wherein each range of guaranteed precision is determined based on the camera position and a predetermined allowable error.

5. The apparatus as set forth in claim 4, wherein the camera comprises an imaging device that converts an optical image into an electronic image, and wherein each range of guaranteed precision is determined based on a resolution power of the imaging device.

6. The apparatus as set forth in claim 4, wherein a magnitude of each range of guaranteed precision changes according to the predetermined allowable error.

7. The apparatus as set forth in claim 6, wherein:

a plan view of a ground surface from perpendicularly above is displayed on the screen as the survey map, each range of guaranteed precision is determined as an area surrounded by two parallel lines perpendicular to the optical axis of the camera, the two parallel lines being respectively separated from the camera by a near limit of guaranteed precision and a far limit of guaranteed precision, and by two lines defining a horizontal projection of an angle of view on the ground surface, the near limit of guaranteed precision is a shortest distance between a line defining an intersection of a vertical angle of view of the camera and the ground surfaces, and a vertical line from the camera to the ground surface, and the far limit of guaranteed precision is a distance from the camera at which a value corresponding to a resolution power of an imaging device of the camera is equal to the predetermined allowable error.

8. The apparatus as set forth in claim 1, further comprising:

a reading processor that reads an image from an image storage medium storing a plurality of images, each image including the target configured to output a displacement amount and a rotational angle, and an input processor that designates an image point corresponding to the physical point in the area marker in the plurality of images in the group.

9. The apparatus as set forth in claim 8, wherein the group comprises a plurality of groups, each coordinate system of each group is determined based on a reference point provided on the target, the coordinate systems of the plurality of groups are converted to the coordinate system of one group, and the area markers of the plurality of groups are displayed on the same screen.

10. The apparatus as set forth in claim 9, wherein the screen comprises an image display area and a drawing area, said display processor displays the images stored in the image storage medium in the image display area, and said display processor displays the area markers of the plurality of groups and the survey map in the drawing area, the area markers being superimposed on the survey map.

11. The apparatus as set forth in claim 1, wherein the group comprises a plurality of groups, an enclosure indicating a boundary of the valid mapping range is determined as a detailed area marker for each group, and the detailed area marker of one group of the plurality of groups, which is determined to be used for mapping to designate a physical point, is displayed on the screen.

12. The apparatus as set forth in claim 11, wherein when one of the plurality of groups is determined to be used for mapping, a simple area marker, which is different from the detailed area marker, is displayed on the screen in a representation different from a representation of the detailed area marker used for mapping.

13. An The apparatus as set forth in claim 12, wherein
each group includes two images photographed at two different camera positions,
when projections of optical axes of the two camera positions on the ground surface in each group form an intersection, a bisector of an angle at the intersection is determined as a provisional optical axis, and
the simple area marker is defined as a boundary of a trapezoidal area based on a near limit of guaranteed precision and a far limit of guaranteed precision for one camera position, the trapezoidal area including two parallel lines perpendicular to the provisional optical axis and respectively separated by the near limit of guaranteed precision and the far limit of guaranteed precision from the one camera position, the trapezoidal area having the provisional optical axis as an axis of symmetry.

14. The apparatus as set forth in claim 12, wherein
each group includes two images photographed at two different camera positions,
when projections of optical axes at the two camera positions on the ground surface in each group do not intersect and lines along angles of view form an intersection, a bisector of an angle at the intersection is determined as a provisional optical axis, and
the simple area marker is defined as a boundary of a trapezoidal area based on a near limit of guaranteed precision and a far limit of guaranteed precision for one camera position, the trapezoidal area including two parallel lines perpendicular to the provisional optical axis and respectively separated by the near limit of guaranteed precision and the far limit of guaranteed precision from the one camera position, the trapezoidal area having the provisional optical axis as an axis of symmetry.

15. An apparatus as set forth in claim 12, wherein
each group includes a plurality of images photographed at a plurality of camera positions,
a plurality of intersection points among projections of optical axes for the plurality of camera positions on the ground surface are calculated, and
the simple area marker is defined as a boundary of a circular area that has a predetermined radius from a center defined by an arithmetic average of coordinates of the plurality of intersection points.

16. A photogrammetric image processing method that utilizes a group comprising a plurality of images, each image commonly including a target placed at a predetermined position and being configured to output an amount of displacement and rotational angle, that calculates a position of a camera taking each image and an inclination of an optical axis of the camera for each image, that designates a common physical point in each image, that calculates three-dimensional coordinates of the physical point, and that generates a survey map based on the three-dimensional coordinates,
said photogrammetric image processing method comprising:
calculating a valid mapping range based on the camera positions and the optical axis inclinations of the plurality of images in the group;
generating an area marker based on the valid mapping range;
displaying the area marker together with the plurality of images on a screen, the area marker being superimposed on the survey map; and
designating a physical point in the area marker in each of the plurality of images displayed on the screen.

17. A storage medium storing a photogrammetric image processing program that utilizes a group comprising a plurality of images, each image commonly including a target placed at a predetermined position that calculates a position of a camera taking each image and an inclination of an optical axis of the camera for each image, that designates a common physical point in an each image, that calculates three-dimensional coordinates of the physical point, and that generates a survey map based on the three-dimensional coordinates,
said photogrammetric image processing program comprising:
an area maker calculation routine that calculates a valid mapping range, enabling designation of the physical point for making the survey map based on the camera positions and the optical axis inclinations for the plurality of images in the group and that generates an area marker based on the valid mapping range; and
a drawing area display processing routine that displays the area marker on a screen, the area marker being superimposed on the survey map.

* * * * *